United States Patent [19]

Baghdady

[11] 4,106,023

[45] Aug. 8, 1978

[54] NAVIGATION AID SYSTEM

[76] Inventor: Elie J. Baghdady, 21 Overlook Dr., Weston, Mass. 02193

[21] Appl. No.: 552,568

[22] Filed: Feb. 24, 1975

[51] Int. Cl.² .................. G01S 1/38; G01S 1/16; G01S 3/52
[52] U.S. Cl. ................... 343/106 D; 343/108 M; 343/113 DE
[58] Field of Search ........ 343/108 M, 106 D, 113 DE

[56] References Cited

U.S. PATENT DOCUMENTS

| | | | |
|---|---|---|---|
| 2,411,518 | 11/1946 | Busignies | 343/113 DE |
| 2,490,050 | 12/1949 | Hansel | 343/106 D |
| 2,547,066 | 4/1951 | Wagner | 343/106 D |
| 2,861,264 | 11/1958 | Lair | 343/113 DE |
| 3,290,685 | 12/1966 | Steiner | 343/108 M |
| 3,798,648 | 3/1974 | Lammers | 343/113 DE |
| 3,900,877 | 8/1975 | Kohler | 343/108 M |

Primary Examiner—Maynard R. Wilbur
Assistant Examiner—Richard E. Berger
Attorney, Agent, or Firm—Burns, Doane, Swecker & Mathis

[57] ABSTRACT

An apparatus or method, for characterizing carrier waves according to the direction in which the carrier waves are transmitted or received, comprises radiating or receiving from a position which is moved repetitively along a line of motion having a predetermined, fixed location in a frame of reference. The radiating or receiving position may be moved so that at least one of the speed and direction of motion is abruptly changed. The radiating or receiving position may be moved back and forth along two non-parallel, straight lines of motion, whereby elevational and azimuthal angles of propagation are determinable solely responsively to the amplitude of the frequency shift induced by the changes in direction of the motion along the lines of motion.

42 Claims, 22 Drawing Figures

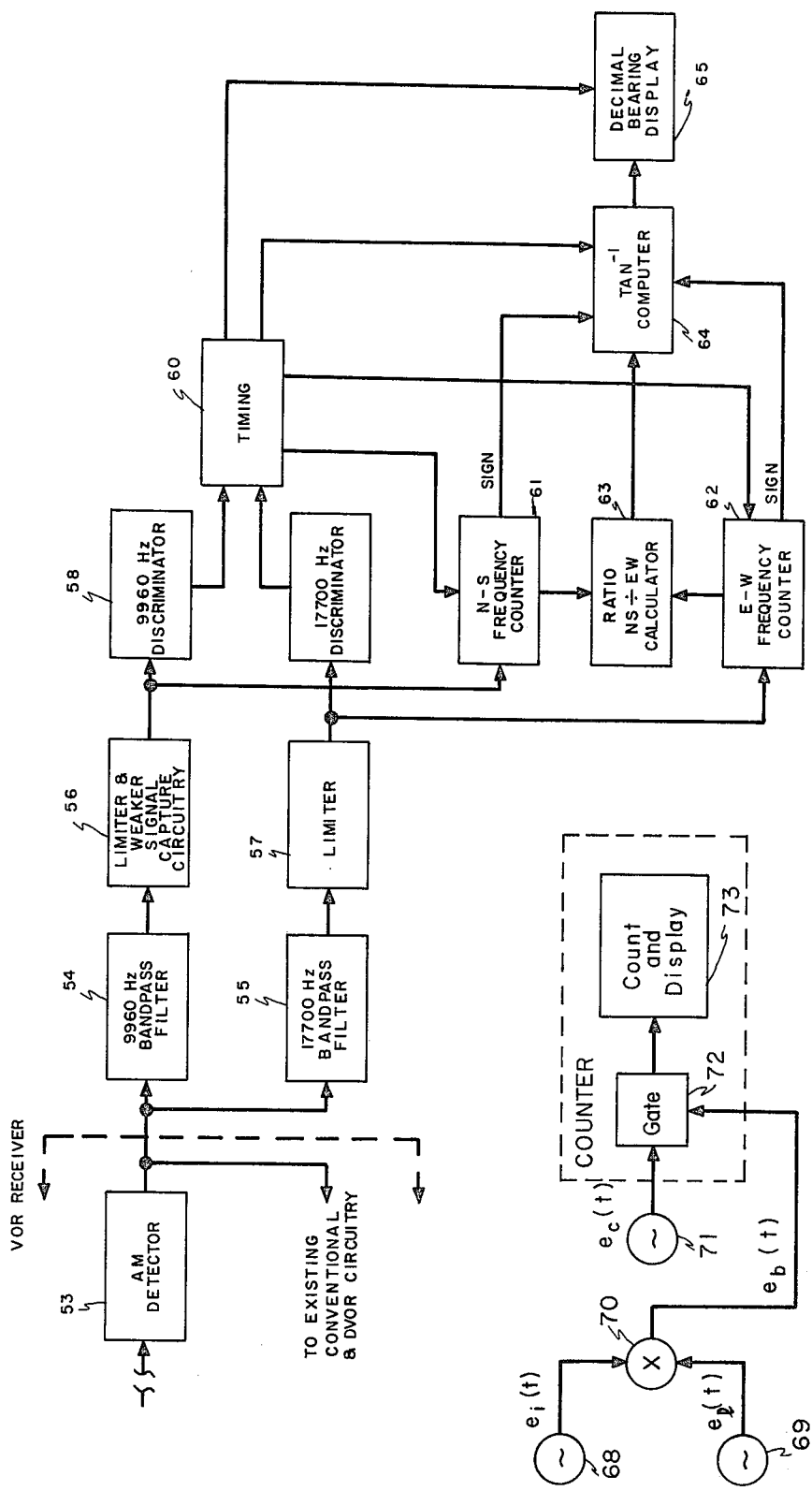

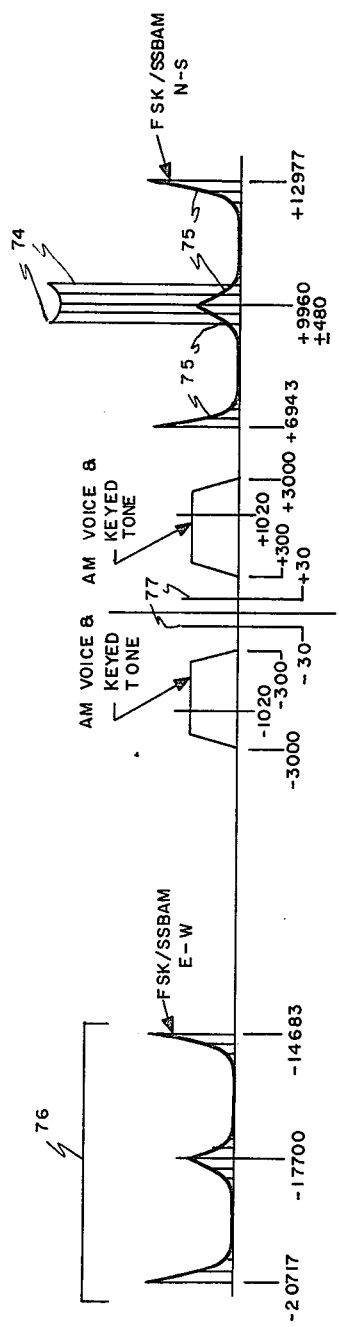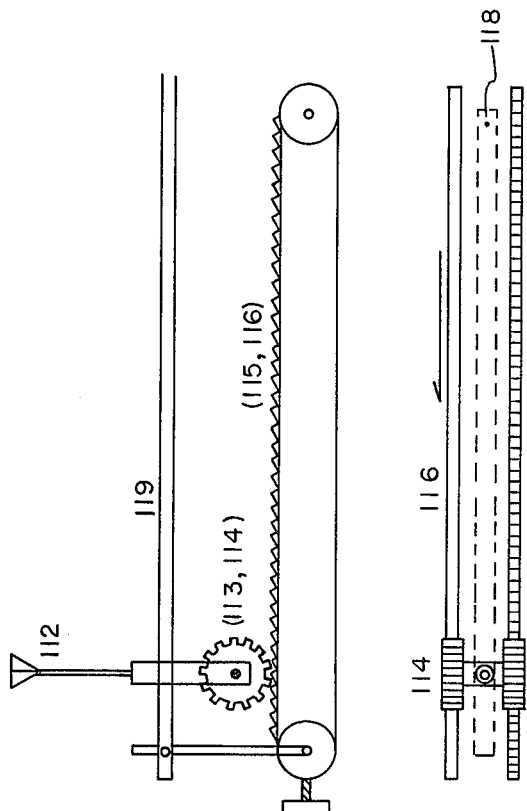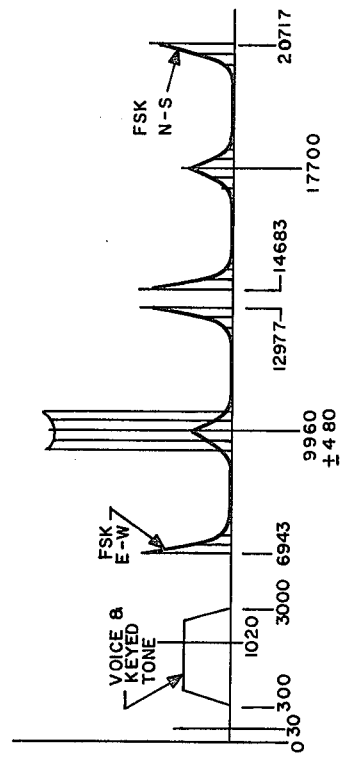
FIG. 8
FIG. 16
FIG. 9

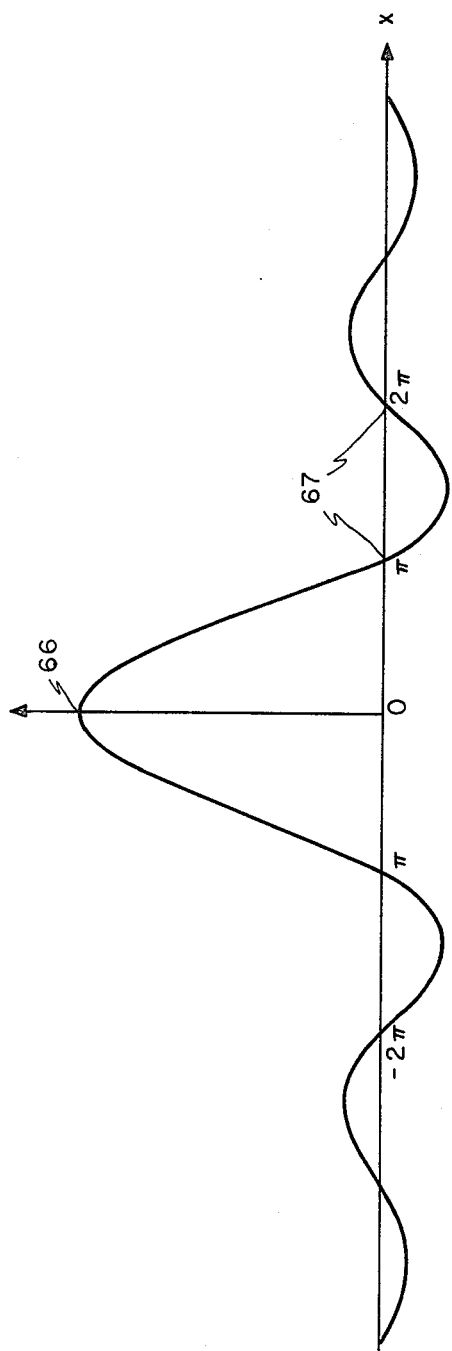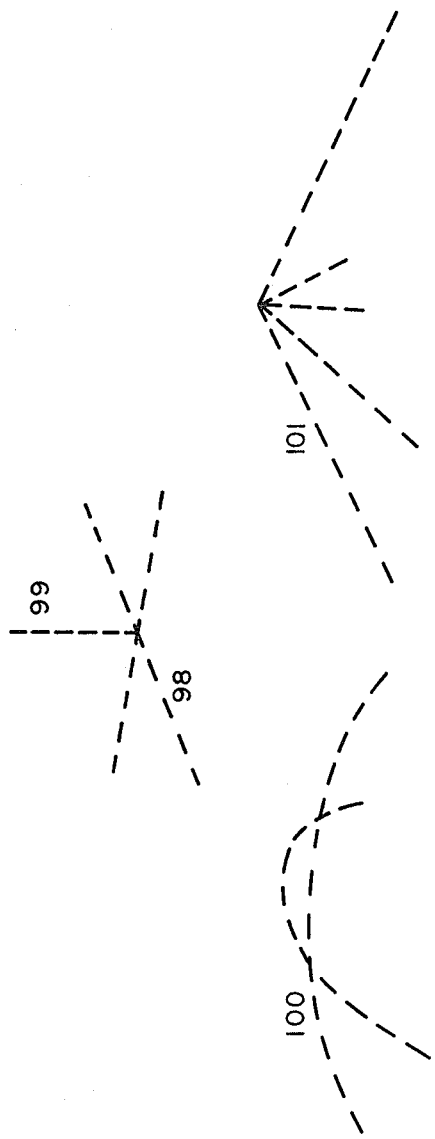

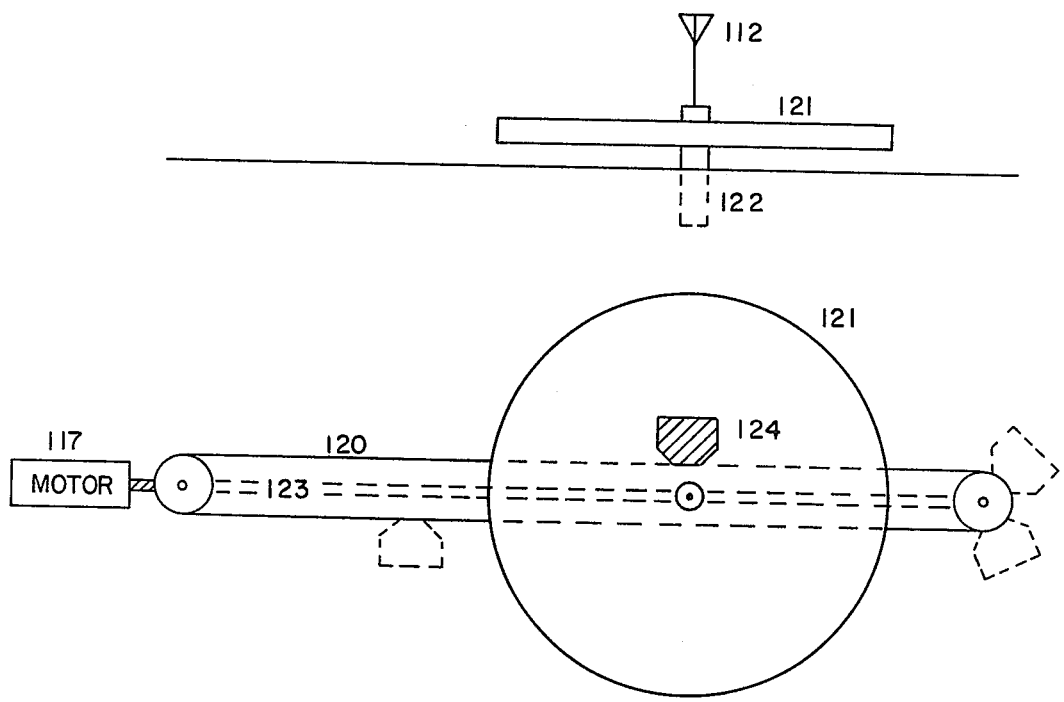
FIG. 17
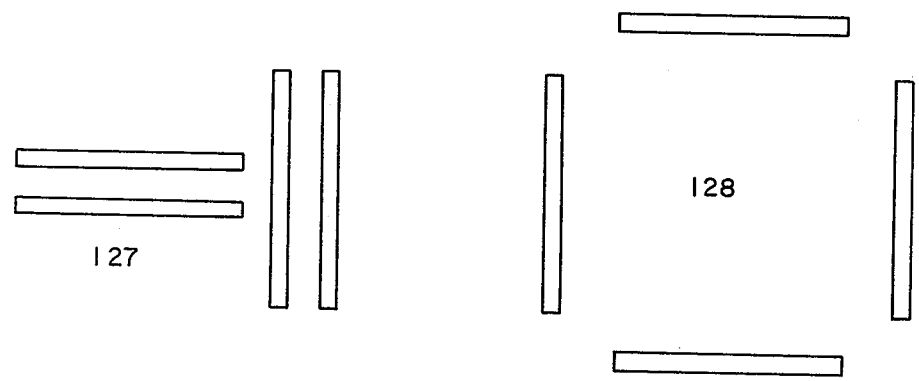
FIG. 18

NAVIGATION AID SYSTEM

The present invention relates broadly to direction finding and position finding methods and apparatus and, in particular, to omni-directional radio navigation aid systems utilizing the well-known Doppler effect.

A number of beacon and navigation aid systems have been described in the patent literature.

One system in common use employs directive antennas to radiate a rotating directional radio beam, and, in addition, a separate omni-directional antenna to radiate a reference signal which is modulated in (amplitude or) frequency at a rate harmonically (or subharmonically) related to the rotational angular velocity of the directional beam. The most notable such system is commonly known in the art as the Conventional VOR system (CVOR or simply, VOR).

Although certain advantages may be claimed for the prior art systems that employ directive antennas to radiate a rotating directional radio beam, including the CVOR, several very serious objections are common to them all. Among these are the practical difficulty of producing and accurately-controlling a directive beam and the serious inaccuracies resulting from certain propagational irregularities to which, as is well-known, beam transmissions are particularly susceptible. The separate directive beam signal and omni-directionally radiated reference-bearing signal are also susceptible to independent error sources which cause degraded performance.

The present invention contemplates overcoming these difficulties by eliminating the necessity for directive beam radiation of the above type and for a separate reference-bearing signal.

Throughout this disclosure, and in the appended claims, the terms "direction-dependent signal" and "azimuth-dependent signal" will be employed to designate signals wherein directional information and azimuth information, respectively, is borne in the variation of one or more characteristics of the signal or is derivable therefrom at a single point in space.

Also described in the patent literature is a system for the radiation of azimuth-dependent signals which does not require a directional transmitting antenna. This system is known in the art as the Doppler VOR (DVOR) system. In this system, the azimuth-dependent signal is generated by commutating a fixed-amplitude, fixed-frequency carrier successively among omni-directional antennas arranged around a circle, to simulate a radiating source that rotates smoothly and uniformly around the circle. The (simulated) uniform rotation of the source causes the signal intercepted by a distant receiver to be modulated sinusoidally in frequency due to the well-known Doppler effect. The phase of the Doppler-induced frequency modulation, when measured relative to any suitable reference phase, is directly dependent upon the azimuth of the radial from the center of the circular array of antennas to the location of the distant receiver. The necessary phase reference is provided in the prior art DVOR systems by a separate, simultaneously and omni-directionally radiated signal.

Throughout this disclosure, and in the appended claims, the term "Circular DVOR" will be employed to mean a Doppler VOR system employing a circular arrangement of omni-directional antennas in the ground station.

Circular DVOR is subject to important limitations that affect its performance and its cost materially, as a result of two important design characteristics. First, in order to obtain the desired azimuth information, Circular DVOR requires a measurement of the phase of the sinusoidal frequency modulation induced by the source rotation around the circle of antennas, relative to a reference sine wave of the same frequency (commonly 30 Hz) conveyed by another separate signal component that is affected differently by propagation and receiver processing error sources. Second, in order to satisfy the requirements of signal compatibility with VOR receivers in use, exactly the same circle size and number of antennas must be used at every site, without regard to differences in the physical surroundings of the various sites, or to the expense of site preparation.

Circular DVOR systems are superior in performance to Conventional VOR systems with regard to siting and other sources of error. Nevertheless, Circular DVOR systems are to an objectionable degree sensitive to siting effects (particularly reflections from surrounding terrain surface features and structures) and to error mechanisms that affect the azimuth-dependent signal and the reference signal separately (such as propagation effects and signal processing in separate receiver circuits or over different segments of the frequency response of the common circuits).

The basic difficulties with prior art Circular DVOR systems can be summarized as:

(a) Siting of ground stations requires careful selection of suitable locations free of reflecting surface features, plus expensive extensive site preparation to level the area for the horizontal circular arrangement and clear nearby potential reflectors.

(b) Phase measurement is used for extracting the azimuth information. This results in errors with nonzero average value (or zero-shift) and requires transmission of a phase reference signal in addition to the azimuth-dependent or data signal. The latter, in turn, generally causes errors due to differences in transmission paths and different processing circuits of the reference and data signals.

(c) Frequently, the selection of ground station site is so limited that objectionable surrounding terrain features and reflecting structures cannot be eliminated or avoided. All prior art VOR and DVOR systems show objectionable levels of error (scalloping) due to the propagation effects associated with site features and reflectors.

The present invention contemplates providing direction finding performance that is nearly free of errors associated with prior art VOR and DVOR systems due to siting effects.

It is a further objective of the present invention to minimize or eliminate the need for expensive VOR site preparations (clearance of protruding features and leveling of terrain).

It is yet a further objective of the present invention to minimize the area occupied by the arrangement of antennas through the use of one-dimensional antenna arrangements (or lines of motion if only one moving antenna is used).

The present invention also contemplates overcoming the difficulties associated with the transmission and reception of a separate reference signal by eliminating the necessity for such a reference signal.

It is yet a further objective of the present invention to provide a means for measuring directional information including both azimuth and elevation angle with almost error-free performance against the effects of ground-station site features and reflectors.

Throughout this disclosure, and in the appended claims, the following terms will be employed:

(a) "Self-reference, direction-dependent signal" whenever the signal intended is one whose direction-dependent parameter conveys the directional information without the need for reference to another signal. With a self-reference, direction-dependent signal, the directional information is conveyed in terms of changes of the value of the direction-dependent parameter relative to another earlier value, or in terms of changes from one "state" of the parameter to another "state."

(b) Since the self-reference is provided by an earlier state or value of the direction-dependent parameter relative to a present one (or by a long-time average of all states or values in certain types of systems), self-reference signals may also be called differentially referenced signals.

(c) "Rectilinear DVOR" (abbreviated RDVOR) designates a Doppler VOR system wherein the ground-station radiating antenna system consists either of a number of antennas arranged along one or more straight lines, or of one antenna that is moved along a straight line.

(d) "Reverse Rectilinear DVOR" (abbreviated (RRDVOR) designates a system wherein the rectilinearly moving antenna or the rectilinear arrangement of commutated discrete antenna is operated in a receive rather than a transmit mode.

As noted earlier, the usual Circular DVOR determines azimuth only by a phase measurement, requiring the direct comparison of the phases of two independent signals. Phase is a parameter that is generally subject to zero-shift errors that cannot be averaged out, and at best is as susceptible as the signal amplitude to inband additive disturbances. Deriving directional information from a frequency measurement, instead, offers all of the well-known advantages of the properties of frequency as a measurable parameter; namely, no requirement for a separate independent reference, no zero-shift errors, averages that are the least sensitive to random phenomena than any other parameter for high S/N ratios, and insensitivity to receiver nonlinearities. Moreover, frequency is basically a discrete parameter, i.e., digital in nature, despite the fact that it is most often treated as a continuous (or analog) variable. Witness the fact that frequency is determined by the zero-crossings of a waveform (more generally, crossings of some level value, usually zero), and such crossings are "digital" events. Hence, basing the necessary measurements on "frequency" rather than phase provides all of the potential implementation reliability and precision advantages of digital systems.

The present invention provides a system that derives directional information, including both azimuth and elevation angle of the radial connecting the ground or reference station and a navigating craft, by frequency measurements. This system, called herein the Rectilinear DVOR, or RDVOR, employs either a radiator that is moved along a straight line, or a rectilinear arrangement of discrete antennas and the signal to be radiated is commutated among these antennas in prescribed successions to simulate rectilinear motion of the radiator. The resulting induced Doppler frequency shift is determined by the direction of the radial to the receiver relative to the orientation of the rectilinear motion of the radiator or of the rectilinear arrangement of commutated radiating antennas. Accordingly, the directional (azimuth and elevation angle) information can be measured precisely by a measurement of Doppler-induced self-referencing frequency changes.

It is to be noted, further, that generally, the noncircular DVOR approach provides systems in which ground antenna geometrical arrangements can be adapted to the peculiarities of a particular site without requiring a redesign of the airborne receiver; i.e., the basic receiver circuitry for signal reception and data extraction can be made invariant, and the signals received from the ground station can be made compatible with the airborne receiver for a wide variety of ground antenna geometrical arrangements. As stated earlier, Circular DVOR systems are constrained to a circular arrangement on the ground and this same arrangement is carried to all types of sites much of which may be unsuited for it without extensive preparations. The noncircular approach provides the flexibility for tailoring the arrangement of antennas to some extent to minimize the necessary site preparations and the effects of certain site features and still remain compatible with the airborne receiver.

The simplest form of noncircular DVOR is the Rectilinear DVOR, wherein the basic ground arrangement can be installed in an orientation, length or number of antennas most suited to the physical surroundings of the ground site without risking incompatibility with one universal airborne receiver design.

Other noncircular DVOR systems are also described herein. In these and in the Rectilinear DVOR, reference signals can be added, if so desired, and an azimuth-sensitive (30 Hz) sinewave can be extracted from the Doppler frequency shifts for performing azimuth determination by phase measurements in the Conventional VOR and Circular DVOR way.

It is yet another object of this invention to provide a novel means for measuring the elevation angle of an elevated object or of a vehicle in flight with respect to a ground or reference plane.

It is yet another object of this invention to provide a novel means for determining the radial line from a reference point on the ground or on a flying vehicle to a distant fixed or moving object such as another point on the surface or another vehicle in flight (a moving aircraft, a drone, a rocket or a missile).

Prior art for determining elevation angles or radials has been based on the use of optical instruments and/or radio interferometry, monopulse or highly directive antenna beams. All of these techniques are handicapped or limited by problems of spatial or positional acquisition of (or the determination exactly where to look for) the distant object or the reference point, and by problems of signal acquisition within narrow tracking bandwidths and of phase measurements or comparisons. None of these problems need be encountered to a comparably limiting degree if the present invention, or a system based on its characteristic principles, is applied to the determination of said radials or elevation angles.

For a better understanding of the invention together with other and further objects thereof, reference is made to the following description taken in conjunction with the accompanying drawings, wherein;

FIG. 5 shows a more detailed block diagram of the receiver of FIG. 1, including, in addition, an arrangement for extracting the directional information from the frequency of the received signal in accordance with this invention;

FIG. 6 shows a weighting function of optimum form for blending the commutation of the signal source among the omni-directional discrete antennas arranged in the manner of FIG. 3 in accordance with this invention;

FIG. 7 shows a detailed block diagram illustrating a method usable in the receiver of FIG. 1 and of FIG. 5, for precise measurement of the frequency of the received signal in accordance with this invention;

FIG. 8 illustrates one arrangement in frequency of the spectra of various signals multiplexed on a Circular DVOR signal plus two superimposed subcarriers for a compatible Rectilinear DVOR in accordance with this invention;

FIG. 9 illustrates the carrier baseband spectrum after AM demodulation of the composite signal of FIG. 8 for one way to realize compatible Circular and Rectilinear DVOR signals in accordance with this invention;

FIG. 12 shows a number of lines of antennas or of antenna motions designed to provide a nonzero Doppler shift at positions on the normal at the location of crossed antenna lines of motion in accordance with this invention;

FIGS. 16 and 17 show detailed illustrations of electromechanical systems for effecting the rectilinear reciprocating motion of an antenna in accordance with this invention;

FIG. 18 shows various arrangements of antenna lines of motion or of pairs of such lines in accordance with this invention;

Figure 1:
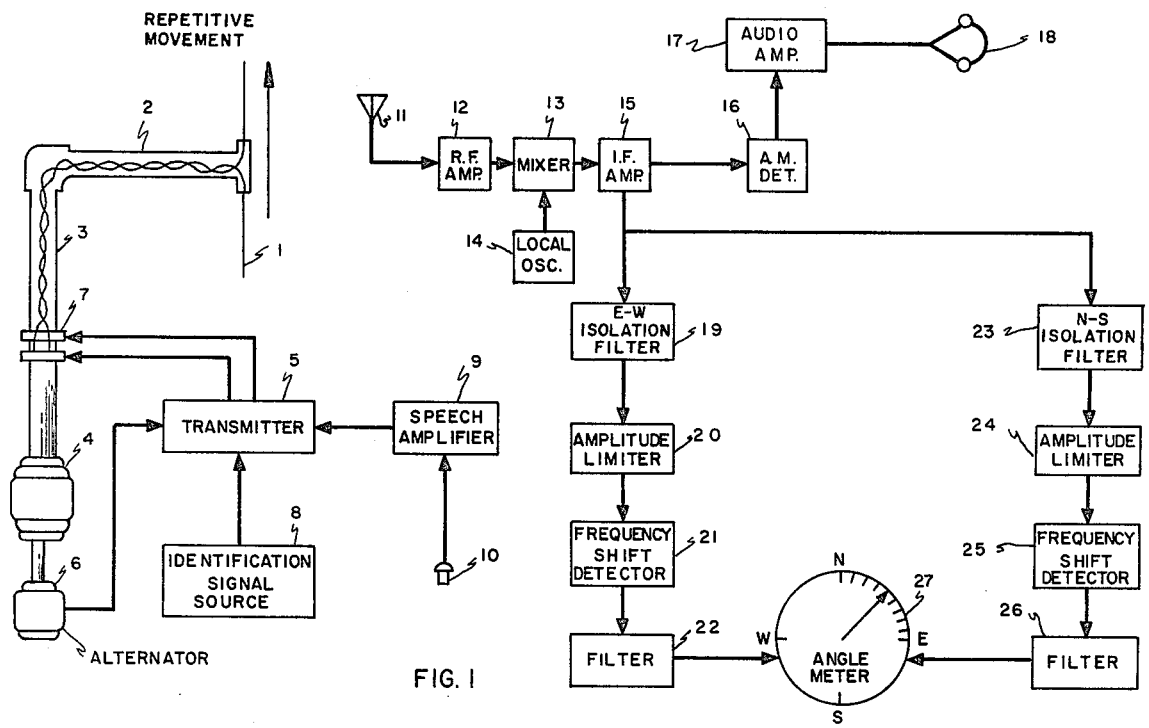
FIG. 1 is a block diagram of one form of radio navigation system in accordance with this invention, including a beacon transmitter and one form of receiving and indicating scheme for deriving directional intelligence from the signals emitted by the transmitter.

Referring particularly to FIG. 1, a transmitter 5 supplies a carrier signal of the frequency $f_o$ to an omni-directional antenna 1 through slip rings 7. The antenna 1 is supported by a horizontal arm 2 and a vertical shaft 3. A motor 4 drives the shaft with a uniform velocity through a system of cams, roller bearings and guide rails thereby causing the antenna to move in a reciprocating back-and-forth manner along a straight line of length D, such as line E-W, of FIG. 3.

Figure 2:
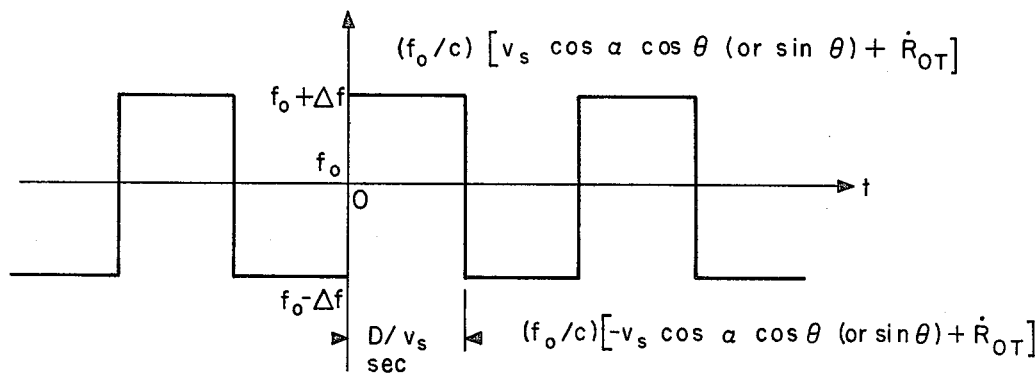
FIG. 2 shows a waveform illustrating the time and direction dependence of the signal frequency as received by a distant receiver in accordance with this invention.

The reciprocating movement of the transmitting antenna 1 along a straight causes the phase of the signal received at each point in space to be advanced and retarded periodically. As a result, the signal radiated by antenna 1 is directionally characterized by periodic variations of frequency. These frequency variations are substantially a square-wave function of time and have a step size between extreme values that is dependent upon direction, as illustrated in FIG. 2. The step size of these frequency variations is determined by the angle between the orientation of the straight line traversed by the moving transmitting antenna and the radial line to the point in space where the signal is received and the measurements are made.

To derive directional intelligence from the transmitted signal at a given point in space, it is merely necessary to measure at said point the frequency step size of the above-described direction-dependent variations.

Figure 3:
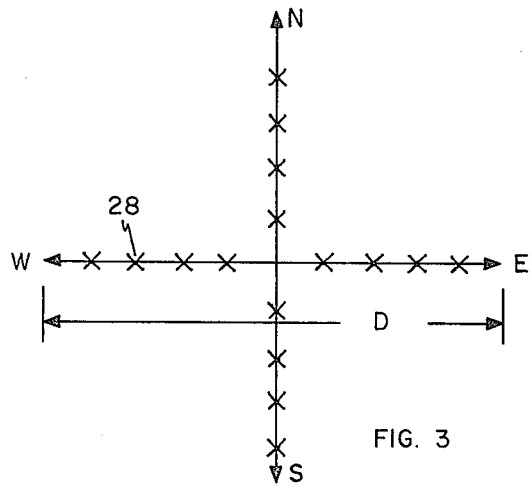
FIG. 3 shows an arrangement of omni-directional antennas in two rectilinear orientations intersecting at an angle, in accordance with this invention.

More specifically, consider an omni-directional radiator of a single-frequency, constant-amplitude signal (carrier waves), the radiator having at least one position from which the signal is radiated. With reference to FIG. 3, if this radiating position is moved at a uniform velocity, v meters/sec, along the straight line of motion E-W, toward a distant stationary or very slowly moving (relative to the source velocity, v) observer, then the frequency of the signal received by the observer will be very nearly $f_o(1+v/c)$, where $f_o$ is the frequency of the signal at the source and $c$ is the velocity of propagation. If the direction of the motion of the radiating position is abruptly reversed, the frequency at the position of the observer will jump abruptly to $f_o(1-v/c)$.

Thus, a source radiating a frequency $f_o$ Hz that moves through a distance D meters at a uniform velocity v meters/sec back and forth exactly toward and away from an observer will give rise at the position of the observer to a signal with a square-wave frequency modulation, such as that shown in FIG. 2, performing frequency jumps of ± $(v/c)f_o$ Hz about $f_o$ Hz, with a dwell time of $D/v$ sec at each value of frequency.

If the source continues to move as described, but the observer moves to a new position from where he views the source along a line that makes an angle $\theta$ with the line traversed by the moving source, the frequency jumps perceived by the observer will now be ± $(v/c)f_o \cos\theta$ Hz. A second source radiating the same frequency (or a different one, if preferred for labeling or some other reason) but moving back and forth a distance D meters at v meters/sec along a line at right angles to the first, will yield a square-wave FM at the new position of the observer with frequency jumps of ± $(v/c)f_o\sin\theta$ Hz. Thus, precise measurements of the frequency jumps for both sources will yield quantities (voltages) proportional to $\cos\theta$ and $\sin\theta$. These can be combined as illustrated in FIG. 5 to yield a precise measurement or indication of $\theta$ which, with additional side information obtained separately (as will be explained later on in this disclosure), can range unambiguously from 0° to 360°.

Of course only one of the above sources is really necessary to determine $\theta$ at the position of the observer. But when the observer views a source along a line that is nearly at right angles to the line of motion of the source, the frequency jumps will be very small and the accuracy of the measurement will be degraded. Indeed, the larger the value of the frequency jump to be measured, the more accurately and precisely the measurement of the jump can be made, and, hence, the determination of $\theta$ will be. If more than one source is used, each tracing a line at a significantly different (and precisely known) orientation from the others, there will always be available to the observer a signal that will execute frequency jumps of magnitude sufficient for ensuring the desired precision in the measurement of $\theta$.

Another benefit of using more than one source moving along different coplanar lines becomes important when the observer views the sources from a point above the plane of the moving sources, at an elevation angle, $\alpha$, that is greater than a few degrees. This occurs, of course, when the height of the observation point above the plane of the source lines of motion is not in the order of a few tenths or less of the horizontal distance to the point that represents the vertical projection of the point of observation on the plane of the source lines or motion. The frequency jumps observed in the distant receiver will then be multiplied by $\cos\alpha$, where $\alpha$ is the elevation angle of the distant receiver relative to the plane of the moving sources. Since $\cos\alpha$ is a multiplying factor common to all observed source frequencies, computation of frequency-shift ratios that yield the arctangent or the arccotangent of the direction angle, $\theta$, will cancel the $\cos\theta$ multiplication factor effect of non-negligible elevation angles. Such computation therefore yields a precise measurement or indication of $\theta$ which, with additional quadrant-ambiguity resolution information obtained separately, can range unambiguously from 0° to 360°.

Sufficient additional information required by the observer for determining the quadrant in which $\theta$ lies is provided by knowledge of the direction of the source motion versus time. For example, for North-South and East-West oriented rectilinear lines of motion, the quadrant of the observer would be indicated by the sign of frequency jump for the combination of the two sources in accordance with the following table:

| Quadrant | Source 1 Motion | | Source 2 Motion | |
|---|---|---|---|---|
| | North-to-South | South-to-North | East-to-West | West-to-East |
| I | − | + | − | + |
| II | + | − | − | + |
| III | + | − | + | − |
| IV | − | + | + | − |

It should be noted that the accuracy of the calculation can be expected to degenerate for elevation angles near 90° (i.e., at or near points located on the perpendicular to the plane of the lines of antennas) inasmuch as the individually measured frequency jumps will then become very small, near or at the zero level. However, this Doppler null condition in the "overhead" positions can be avoided in a number of ways such as those illustrated in FIG. 12. With reference to FIG. 12, we may use a line of antennas 99 normal to the plane of the intersecting E-W and N-S lines 98; arched "lines of motion" 100; or angled lines of motion forming the edges of a pyramid 101. The required degree of arching can be determined by the minimum frequency shift that must be measured in order to ensure a specified resolution or accuracy in the measurement.

A labeling doctrine will of course be required to identify uniquely the different lines traversed by the moving radiators and to provide the sense or polarity of the source motion relative to a reference direction. Labeling for source identification can be provided, for example, by allocating source frequencies in some judicious way, or by assigning different line lengths or different linear velocities or by introducing some peculiar "kink" in the row of antennas for various sources. Line length and velocity of uniform back-and-forth reciprocating traversals of a line determine the period (or fundamental frequency) of the square-wave frequency modulation. A marker "kink" deviation from a linear motion of the source antenna, or a simultaneous dwell over one or over a few fixed antennas at an end of the line or at some intermediate location, causes a variation from the square wave pulse which can be recognized to identify the associated line of motion of the radiator and the direction of its motion.

The signal received by the distant receiver is therefore completely direction-dependent since, in accordance with the previously stated definition, it is possible to receive this signal at a single point in space and to translate the periodic variations of its frequency into direction intelligence. This fact will also be apparent from an examination of the mathematical expression for the signal that reaches a distant observer at point X in space moving with a uniform radial speed $v_R$, relative to a ground station whose radiating source is imagined to trace a continuous rectilinear path back and forth with a uniform speed $v_s$. If the radiated frequency is $\omega_o$ rad/sec, the resulting received signal will be frequency-shift-modulated (FSM) and it can be expressed in the form $$e_{FSM}(t) = \cos\{[\omega_o + \Delta\Omega e_{sq}(pt)]\, t + \varphi_o\}$$
$$= Re\{e^{j(\omega_o t + \varphi_o)} \cdot e^{(\Delta\Omega)t e_{sq}(pt)}\} \quad (1)$$

where $\omega_o$ and $\varphi_o$ are the radian frequency and initial phase of the signal as it would reach the observer in the absence of source motion;

$\Delta\Omega$ is the radian frequency shift from $\omega_o$ caused by Doppler due to the relative speed between source and receiver. This frequency shift is given by $\Delta\Omega = (v/c)f_o \cos\theta + v_R f_o/c$ for a particular source line of motion, and by $\Delta\Omega = (v/c)f_o \sin\theta + v_R f_o/c$ for a second line of motion at right angles to the previous one, and $e_{sq}(pt)$ is a normalized square wave of period $2\pi/p$ sec. with extreme values of $+1$ and $-1$ and dwell time of $\pi/p$ sec. at each extreme.

The modulating factor in Eq. (1) can be expanded to yield $$e^{j(\Delta\Omega)t e_{sq}(pt)} = \cos(\Delta\Omega)t + je_{sq}(pt)\sin(\Delta\Omega)t \quad (2)$$

This shows that the spectrum of the signal received by the distant receiver consists of the combination of two replicas of the spectrum of a square wave, one shifted to the right of 0 Hz an amount $\Delta\Omega$ rad/sec and one to the left by the same amount, plus lines at $+\Delta\Omega$ and $-\Delta\Omega$ rad/sec. The outcome of these combinations is a line spectrum that is familiar in the theory of modulated signals.

As noted in the definition of $\Delta\Omega$, motion of the distant receiver contributes a component of Doppler shift which will add (or subtract) directly from the Doppler shift induced by the motion of the ground radiating source. However, because this additional Doppler shift has the same sign over both the positive half as well as the negative half of the square wave, it will drop out and cause no error if the peak-to-peak frequency deviation is used for determining the desired directional information, and if the radial speed of the receiver remains essentially constant over a period of $2\pi/p$ sec.

The transmitter 5, in FIG. 1, may also be modulated by a suitably coded identification signal derived from an identification signal source 8 and by voice communication signals or other intelligence. For this latter purpose a speech amplifier 9 and microphone 10 are provided.

FIG. 1 also shows a superheterodyne receiver for receiving a signal of the general type represented by Eq. (1) and for deriving directional intelligence therefrom. The receiver is entirely conventional up to and including the intermediate-frequency amplifier 15. The output of said intermediate-frequency amplifier is divided and impressed upon two filters 19 and 23 for isolating an east - west and north - south component of the frequency modulated signal, respectively. The filters 19 and 23 are operatively connected to limiters 20 and 24. An amplitude-modulation detector 16 is likewise connected to the intermediate frequency amplifier.

The output of the amplitude-modulation detection 16 is connected to a monitoring channel, comprising an audio amplifier 17 and headphones 18.

The amplitude limiters 20 and 24 serve to reduce the amplitude modulation of the portion of the intermediate-frequency signal impressed thereon. The output of each said limiter is therefore substantially a pure frequency-modulated signal. This signal can be demodulated in a frequency-modulation detector but, since such detectors are somewhat inaccurate, it is preferable to measure the frequency of the signal by a special precision frequency or zero-crossings counting arrangement such as that illustrated in FIG. 7 and described later on in this disclosure.

The output of frequency-shift detector 21 corresponds to one source in rectilinear motion and hence contains a component that is directly proportional to $\cos\theta\cos\alpha$ whereas the output of frequency-shift detector 25 corresponds to another source in rectilinear motion along a line making some nonzero angle with the first and hence, for orthogonal lines, it includes a component that is directly proportional to $\sin\theta\cos\alpha$. After filtering by filters 22 and 26, the detected frequency shifts are impressed upon an angle meter/indicator 27 to give the output reading of the measured azimuth $\theta$.

Thus far, there has been described a beacon transmitter provided with a moving antenna. In accordance with the familiar Doppler principle, the motion of the radiating antenna produces direction-dependent phase and frequency variations in the signal received by a distant receiver. A receiver has been described which is capable of translating such variations into directional intelligence.

In the practice of this invention, it may, under certain circumstances, be inconvenient to move the transmitting antenna physically. Indeed, the process of sliding one radiator smoothly, precisely and at a uniform velocity back and forth along a line several tens, perhaps a few hundreds, of feet in length may present formidable mechanical problems. But, just as in the case of Circular DVOR based on monochromatic-source motion at uniform velocity around a circle, the rectilinear motion described above can be simulated by successively connecting the output of one stationary transmitter to discrete, stationary antennas arranged in a straight line of the desired length and orientation. Two such orthogonal arrangements are illustrated in FIG. 3. This will be particularly the more practicable approach when the beacon transmitter is operated at the lower frequencies where the antenna dimensions are necessarily quite large.

Figure 4:
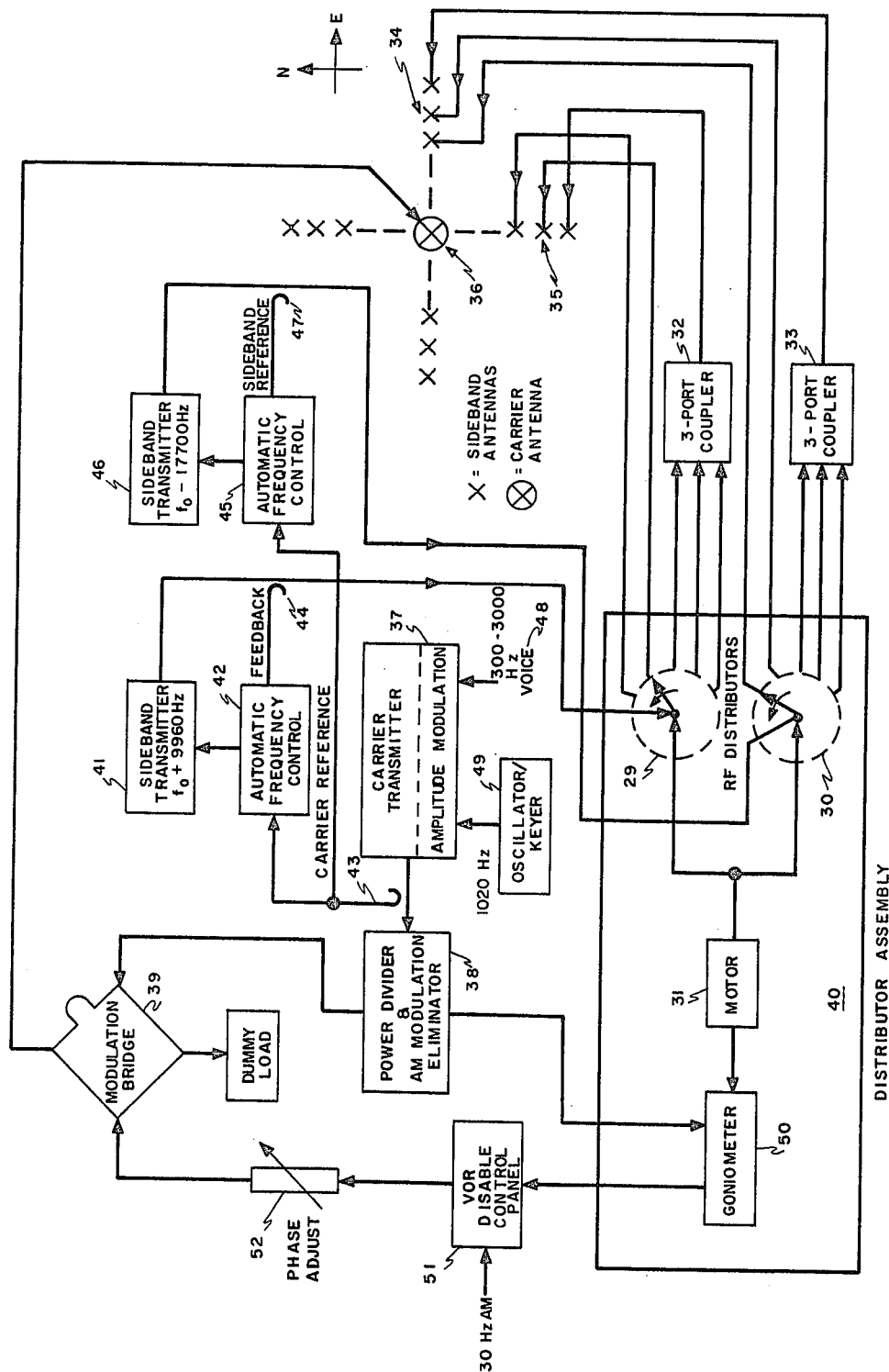
FIG. 4 shows a more detailed functional block diagram of a Rectilinear DVOR ground station transmitting system including a distributor assembly for simulating a radiating source that moves along a rectilinear sequence of positions in accordance with this invention.

It will therefore be preferable under many practical circumstances to employ several fixed antennas and then to produce an effect substantially equivalent to the rectilinear motion of a single antenna. This can be accomplished, as shown in FIG. 3, by arranging a convenient number of antennas 28, for example ten or more, uniformly along a straight line and then connecting the output of the transmitter to these antennas in rapid succession by means of a suitable motor-driven commutating switch 29 (FIG. 4). The commutating arrangement may take several other forms. For example, each antenna can be terminated in a stationary coil (or a capacitor plate), the several coils (or capacitor plates) being arranged around a circle, and a rapidly-moving primary coil (or capacitor plate) employed to transfer energy from the transmitter to the individual antennas in rapid succession. It is also possible to commutate the antennas electronically, without the use of mechanically moving parts, by employing an electronic switching or commutating distributor consisting of a transistor or vacuum-tube circuit or modulator between each antenna and the transmitter. In an electronic distributor the transistors, tubes or modulators are activated in rapid succession by applying appropriate switching or modulating potentials. A special beam-deflection commutating tube somewhat similar in construction to a cathode-ray tube could also be employed. This tube could be provided with properly-spaced target electrodes in place of the customary screen, and a rotating deflection field could be used to scan or commutate the electrodes in very rapid succession.

When a multiple-antenna arrangement is employed, as described above, direction-dependent phase or frequency modulation of the radiated signal is produced by a synthetic Doppler effect resulting from the simulated motion of the radiating source.

The theory of simulating antenna motion by successive energization of discrete, stationary antenna elements arranged along the desired line of motion brings out the important criteria for selecting the number of discrete fixed antennas for a given desired length of line and linear speed of traversal, the optimum blending function in the transition of the energization from one antenna to the next, the exact way in which blending affects the radiated signal and the receiver operations necessary for extracting the desired information when fewer and fewer antennas are used. For these purposes, consider an array of N uniformly spaced antennas arranged in a straight line of length D, each characterized by omni-directional amplitude and phase radiation patterns. The antennas are switched on and off in succession so that the excitation proceeds uniformly along the line at a velocity of v meters/sec, completing a full-return excursion every 2D/v sec. The switching need not be abrupt, the excitation of each antenna can be varied smoothly and continuously according to some "blending" function, $f_b(t)$, which may be real or complex (the latter indicating both amplitude and other than 0 or $\pi$ phase modifications).

Using the notation and expressions employed in Eqs. (1) and (2), we can readily show that simulating the continuously moving source in the manner described above replaces the modulating function of Eq. (2) by $$e_{com}(t) = f_b(\tau) \underset{t}{\otimes} \sum_{n=-\infty}^{\infty} e^{j(\Delta\Omega)\tau} e_{sq}(p\tau) \cdot u_0(\tau - T_s) \quad (3)$$

where
$T_s = D/(N-1)v$
= time it would take to move between two successive antennas at $v$ meters/sec,
$\underset{t}{\otimes}$ = denotes convolution of functions on both sides of this symbol, evaluated at time $t$,
$u_0(t)$ = unit impulse function at $t = 0$,
and
$\tau$ = dummy variable of convolution integral. The result expressed in Eq. (3) shows that the signal received by a distant observer from the commutated rectilinear arrangement of discrete stationary antennas is equivalent to a sequence of periodically recurring impulses, each weighted by the value of the continuous-motion modulating function of Eq. (2) at the instant of occurrence of the impulse, the whole sequence being filtered by a linear filter characterized by $f_b(t)$ as its unit-impulse response. The summation to the right of the convolution (or linear filtering) symbol in Eq. (3) expresses the result of sampling the squarewave FM modulating function of Eq. (2) by impulses recurring at the rate of $f_s$ Hz, where $$f_s = 1/T_s = (N-1)v/D \quad (4)$$

In the frequency domain, convolution transforms to multiplication. The spectrum of the impulse-sampled modulating function consists of replicas of the spectrum of the function of Eq. (3) repeated with centers at 0 Hz and at all positive and negative integer multiples of the sampling frequency, $f_s$. The spectrum of the signal reaching the distant observer from the commutated rectilinear array is thus given by (with $\omega_s = 2\pi f_s$)

$$E_{com}(\omega) = f_s F_b(\omega) \sum_{n=-\infty}^{\infty} E_m(\omega - n\omega_s) \quad (5)$$

where $F_b(\omega)$ is the Fourier transform of $f_b(t)$, and $E_m(\omega)$ is the Fourier transform of the modulating function of Eq. (2). The blending is thus seen to be eqivalent to a linear filter characterized by a frequency-response function $F_b(\omega)$.

In order to determine the optimum blending function, we first need to examine the sampled-signal spectrum (i.e., the sum on the right-hand side of Eq. (5) and the effect of the number of antennas N upon the sampling frequency, $f_s$, as brought out in Eq. (4). We first observe that the spectrum of the modulating function of Eq. (2), denoted $E_m(\omega)$ in Eq. (5), is determined by the spectrum of the normalized square wave $e_{sq}(pt)$, by adding two replicas of the spectrum of the square-wave, one centered about $\omega = \Delta\Omega$, the other about $\omega = -\Delta\Omega$. The properties of $E_m(\omega)$ can be summed up by noting that $E_m(\omega)$ consists of spectral lines which, for large value of $\delta = \Delta\Omega p$, bunch around the frequencies $\omega = \pm\Delta\Omega$, spaced $p$ rad/sec apart, extend theoretically over an unlimited frequency range, but are practically significant only within the range $|\omega| < \Delta\Omega + kp$, where $k$ is some small integer (usually taken to be about 3 or less).

Thus, the various frequency-shifted and added replicas of $E_m(\omega)$ in the summation factor of Eq. (5) may or may not turn out to have overlapping frequency ranges that encompass their significant components. If it is desired that no overlap of these ranges for adjacent replicas be allowed, then the sampling frequency, $\omega_s = 2\pi f_s$, must satisfy the condition $$\omega_s < 2(\Delta\Omega + kp) \quad (6)$$

Now, the maximum value of $\Delta\Omega$ for a line of length D that is traversed in both directions $p/2\pi$ times every second is given by (very approximately for $v \ll c$), $$(\Delta\Omega)_{max} = [2D/(2\pi/p)](\omega_o/c) = 2(D/\lambda_o)p \text{ rad/sec} \quad (7)$$

where $\lambda_o$ is the wavelength at the original source frequency. Therefore, if $\omega_s$ is to satisfy condition (6) for the maximum value of $\Delta\Omega$ we must have $$\omega_s < 2(2D/\lambda_o + k)p \quad (8)$$

Substitution for $\omega_s$ from Eq. (4), noting that $D/v = p/\pi$, leads to $$N > 2(D/\lambda_o) + k + 1 \quad (9)$$

This inequality gives the condition that the number, N, of antennas must satisfy in order to ensure that the significant parts of the spectra of the various replicas of $E_m(\omega)$ in the summation of Eq. (5) are non-overlapping. The corresponding condition for a circular DVOR array of diameter D is $$N > 2\pi(D/\lambda_o) + k \quad (10)$$

where $k$ is again the multiple of $p$ to be allowed for beyond the peak frequency deviation in order to include all of the spectral components that are considered significant. If we let $N_+ = 2N - 1$ denote the total number of antennas that two crossed rectilinear arrangements must have in order that each satisfy the condition stated above for spectral separability of the sampling spectral zones, and $N_\odot$ the corresponding number for the circular array of the same $$\frac{D}{\lambda_o}, \text{ then for } (\frac{D}{\lambda_o}) >> k \quad (11)$$

$$\frac{N_\odot}{N_+} \approx \frac{\pi}{2} \approx 1.5$$

(which is also the ratio of the length of the circumference of the circle to twice the diameter). This shows that two crossed rectilinear arrangements require about ⅔ as many antenna elements as a circular arrangement of equal aperture to ensure separability of the sampling spectral zones by time-invariant, selective, linear filters. For $(D/\lambda_o) = 50$, conditions (9) and (10) become very nearly N > 100 for one line
$N_+$ > 200 for two crossed lines and
$N_\odot$ > 300 for a circular array If condition (9) is satisfied, then all spectral zones other than $E_m(\omega)$ in Eq. (5), plus "insignificant" components of $E_m(\omega)$, can in principle be suppressed completely if $$F_b(\omega) = 1 \text{ for } |\omega| \leq \Delta\Omega + k\rho = 0, \text{ otherwise} \quad (12)$$

That is to say, if N satisfies condition (9) and $F_b(\omega)$ satisfies Eq. 12 then Eq. (5) reduces to $$E_{com}(\omega) \approx f_s E_m(\omega) \quad (13)$$

By definition, the blending function $f_b(t)$ whose Fourier transform satisfies Eq. (12) so that Eq. (5) would reduce to Eq. (13) is called the optimum blending function. By inverse Fourier transformation, we obtain $$f_{b,\,opt}(t) = \frac{\sin(\Delta\Omega + k\rho)t}{\pi t} \quad (14)$$

$$= f_s \frac{\sin(\frac{\omega_s}{2})t}{(\frac{\omega_s}{2})t}$$

where, in the second step, we took a limiting case in which the > sign in Eq. (6) is replaced by equality. Thus, the optimum blending function is the $(\sin x)/x$ function shown in FIG. 6.

It is interesting to observe that condition (9) can be rewritten in the form $$\frac{D}{N-1} < \frac{\lambda_o}{2}(1 - \frac{k}{N-1}) \approx \frac{\lambda_o}{2} \text{ for } k << (N-1) \quad (15)$$

If $D/(N-1)$ is recognized as the uniform separation between successive antennas, then condition (15) states that condition (9) signifies that the spacing between successive antennas must be smaller than one-half of the wavelength of the radiated fixed frequency, $f_o$.

It is important to consider next the effect of violating condition (9) on the number of antennas (or condition (15) on the uniform separation between successive antennas). In terms of Eq. (5), a smaller N would cause the various replicas of $E_m(\omega)$ in the summation to overlap so significantly as to become inseparable by a time-invariant linear filter or blending function. It is important to observe, however, that the typical replica $E_m(\omega - n\omega_s)$ represents a complex modulating time function given by the basic (or $n = 0$) one, but with its reference (or center) frequency shifted from 0 Hz to $f = nf_s$. In other words, the $n$-th spectral zone in Eq. (5) represents a modulating function in time which executes frequency jumps of $\pm\Delta\Omega$ with reference to $\omega = n\omega_s$, in accordance with the same square-wave time function, $e_{sq}(\rho t)$, that times the frequency jumps of the basic modulating function (i.e., the one expressed in Eq. (2)). Thus, in the time domain, the sampled composite signal expressed by the sum in Eq. (3) is made up of replicas of the basic function of Eq. (2), each centered at an integer multiple (or zero) of the sampling frequency, $f_s$, and executing frequency jumps described by the same function $\Delta\Omega e_{sq}(\rho t)$. Consequently, although the Fourier transforms overlap inextricably, the time functions are sinewaves that frequency jump in step by the same amount in the same direction so that adjacent ones are always spaced $f_s$ Hz apart. This means that any particular replica can still be separated from the others by means of a time-variant selective filter with a bandwidth roughly equivalent to that required to accommodate the significant components in the spectrum of $e_{sq}(t)$ -- a band of width $k\rho$ rad/sec (where a value of 3 for $k$ may suffice for most practical purposes). A phase-locked loop simulates such a filter when the signal-to-noise ratio is well above its threshold of linear response, and hence is well suited to the task of tracking either the basic modulating function or one of its replicas.

Some important observations can be made by examining the ratio of sampling frequency to maximum frequency jump, as a function of the number N of antennas used. Using Eqs. (4) and (7), and noting that $v/D = \rho/\pi$, we obtain $$\frac{\omega_s}{(\Delta\omega)_{max}} = \frac{N-1}{\frac{D}{\lambda_o}} \quad (16)$$

For numerical illustration, if $D/\lambda_o = 50$ and $N = 50$, then the ratio in Eq. (16) is 49/50. This signifies that if a phase-locked loop is intended to track, say, the basic ($n = 0$) spectral-zone modulating function (i.e., the one expressed in Eq. (2)), and we start from a peak positive frequency jump, then when the frequency of the basic modulating function jumps to $-(\Delta\Omega)_{max}$, the frequency of the replica around $f_s$ will jump down to $-(1/50)(\Delta\Omega)_{max}$. The phase-locked loop, in trying to follow the jump of the modulation it is intended to track, sweeps down toward $-(\Delta\Omega)_{max}$, but is intercepted on its way by the replica of the modulating function centered at $f_s$ which will have jumped to $\omega_s - (\Delta\Omega)_{max} = -(1-50)(\Delta\Omega)_{max}$ and hence will more probably be acquired by it. Although this gives the appearance of ambiguity in which replica of the basic function the measurement is being made on, in reality no ambiguity exists. The reason is that the precise measurement of frequency will, as explained later on in this disclosure, be made in terms of deviations from a precisely known reference bias frequency, and we know in advance that the frequency jumps must be symmetrical about this bias frequency if the phase-locked loop tracks only one of the sampling spectral signals. Measurement of asymmetrical jumps about the reference bias frequency can therefore be unambiguously interpreted, or corrected by adding or subtracting the precisely known sampling frequency from one of the readings. Alternatively, the phase-locked loop can be aided automatically to seek and lock onto only the other frequency position of the 0 - centered replica of the modulating function (or of any one of the other replicas centered about $f_s$ or harmonics of it) once one of the frequency positions is determined. This can be done by injecting a DC bias on the VCO of the phase-locked loop of amount equal to what would pull its frequency to near where the alternate frequency position of the tracked signal would be. The necessary lock-aiding DC bias is determined from the results of a correct measurement of one of the frequency positions. The bias is applied only for a part of the dwell time on the deviation being measured. Since the period $2\pi/p$ of the square wave is known precisely, the next jump can be anticipated and the DC bias on the VCO changed to pull the phase-locked loop to the alternate value of frequency that the signal is about to jump to. This technique of aiding the phase-locked loop provides an important fringe benefit in that the signal acquisition by the loop is speeded up, and hence the search and lock-in transients are reduced.

Another way in which the phase-locked loop can be made to track exclusively one of the signals in the sampling spectrum is to modify the ground-source "motion" near the ends of the rectilinear arrangement so that the frequency change from $+\Delta\Omega$ to $-\Delta\Omega$ and back is not abrupt, but rather follows a gradual line of transition such as a ramp or a transitional portion of a sinewave. The ramp transition can be secured by slowing down the "motion" over a few antennas at each end of the line, bringing it to rest at the end antennas and building it up linearly again on the reverse leg of the sweep. This would yield a trapezoidal rather than a square-wave frequency modulation. The ramp portions of the trapezoid would occupy a small fraction of the period, and would not only aid the phase-locked loop to track exclusively one of the frequency-modulating functions, but would also improve the spectrum of the modulating function because the spectrum would then fall off more rapidly with frequency outside of the $\pm\Delta\Omega$ limits.

If the antenna switching requirements of a ramp or other gradual transition (e.g., the rising and falling sections of a sinewave) are objectionable, the rectilinear arrangement may be supplemented by an outside small-radius circular arc of antennas or by one antenna that actually rotates around a circle of small radius centered at or near each of the extremities of the line of antennas. The rate of linear motion may now be maintained fixed over the linear arrangement, and upon reaching an end of the line, the motion continues over the end circular arc for the turn-around to the opposite sense of the rectilinear sweep. This arrangement can be designed to yield both a time tag for the sense of the rectilinear motion and a sinewave type of transition for continuous control of the phase-locked loop frequency by only one of the frequency-modulating functions in the spectrum radiated by the commutated antenna sequence.

Finally, a few remarks are in order concerning the selection of a numerical value for the fundamental repetition rate $p/2\pi$ Hz for the back-and-forth "motion" of the source. This parameter can be chosen as 30 Hz if it is desired to adapt a Circular DVOR distributor for performing the energization of the sequence of antennas. Thus, with $$D/\lambda_o = 50 \text{ and } p/2\pi = 30 \text{ Hz}$$

we obtain $$(\Delta\Omega)_{max}/2\pi = 3000 \text{ Hz}$$

whence the maximum peak-to-peak frequency jump is 6000 Hz.

But since the precision and immunity of the system to multipath and additive noise and interference are greater the greater the frequency jumps, a value of $p/2\pi$ greater than 30 Hz may be preferred if compatibility with a Circular DVOR distributor and spectrum constraints barring the greater frequency jumps are not overriding considerations.

An essential requirement for realizing the full precision and performance improvement capabilities of the Rectilinear DVOR technique described in the present invention is the precision measurement of frequency shifts. High-precision measurement of frequency shifts can be performed by digital techniques of the type described in the next few paragraphs.

The first step in a receiver for precise measurement of frequency shifts to be expected in a signal from a Rectilinear DVOR commutated antenna sequence is to mix the incoming signal with a very stable local reference oscillation to obtain a low-frequency beat signal. Thus, if the incoming doppler-shifted signal is, momentarily, represented by $\cos[2\pi(f_o + f_d)t + \varphi_o]$, and the local reference signal by $\cos[2\pi f_{ref}t + \varphi_{ref}]$, the desired beat signal is given by $$\cos \theta(t) = \cos [2\pi(f_o - f_{ref} + f_d) t + \varphi_o - \varphi_{ref}] \quad (17)$$

Measurement of the frequency of this signal coupled with exact knowledge of $f_o - f_{ref}$ then yields the momentary frequency shift, $f_d$. The frequency difference $f_o - f_{ref}$ is known as the bias frequency, and is chosen to exceed the largest expected negative Doppler frequency shift by an amount sufficient to yield a minimum measurement error in the measurement process.

The measurement of the frequency of the signal represented by Eq. (17) may be performed by standard analog methods (such as a frequency discriminator) or by digital counting methods. Analog measurement methods are discounted in precision frequency measurements because they are less suited for high precision than frequency counting. Therefore the discussion here will be restricted to digital counting.

Precise frequency measurement by digital counting can be implemented in at least two practicable ways; namely, either by precise measurement of the time interval covered by a fixed count (or number of cycles or periods) of the frequency to be measured (the bias frequency plus or minus the Doppler shift), or by counting the number of zero crossings (or cycles or periods) that occur within a fixed counting interval. Only the former of these methods will be described briefly here for illustration purposes, although the latter methods may be preferred by some who are versed in the art.

A functional diagram of the operations for high-precision digital measurement of period for a fixed number of zero crossings is shown in FIG. 7. A very stable local-oscillator, $e_l(t)$, is mixed with the incoming signal, $e_i(t)$, to produce a beat signal $e_b(t)$ at some center "bias" frequency, $f_b$, plus or minus the frequency deviation to be measured. (The bias frequency $f_b$ represents $f_o - f_{ref}$ in Eq. (17)). The beat signal $e_b(t)$ is introduced as a triggering signal to a gate in the counter. At one zero-crossing of $e_b(t)$, the gate opens to pass the high-frequency counter oscillator signal, or "clock," $e_c(t)$, which is "accumulated," or counted in the counter register. After an integral number of periods, or zero-crossings, of $e_b(t)$, the gate is closed and the total count read. As the period of $e_c(t)$ will be a simple decimal fraction a second, say 0.1 microsecond for a 10 MHz clock, the counter will display the total number of 0.1 microseconds that equal the integral number of $e_b(t)$ periods. We define the length of time the gate is open as T. Several consecutive measurements of length T may be made, and the resulting data reduced to yield the average value and the mean square fluctuation of the accumulated periods. A counting error $\Delta N$ could result from residual frequency instability of $e(t)$, or $e_c(t)$, or from jitter in the leading or the trailing edges, or both, of the gate.

In a Rectilinear DVOR, the optimum value for the center "bias" frequency $f_b$ is equal to three times the expected maximum positive or negative frequency shift $f_{d, max}$ caused by the Doppler effect. As an illustration, if $D/\lambda_o = 50$ and $\rho/2\pi = 30$ Hz, $f_{d, max} = 3000$ Hz and, hence, $f_{b, opt} = 9$ kHz.

A most significant fact about the Rectilinear DVOR described in this invention is that such a system is almost completely immune to multipath effects (azimuth errors, course scalloping, etc.) such as plagues the older types of VOR (Conventional VOR, Circular DVOR and PDVOR). The reason for this is simply that in the Rectilinear DVOR, azimuth is determined directly from the frequency shift (or jump) of the resultant of direct and indirect propagation paths which, after post-detection filtering, is determined exactly (almost always) by the Doppler frequency shift portrayed by the (always stronger or strongest) direct path. In contrast, azimuth is determined in the other types of VOR from the direction-dependent phase of an induced modulation waveform relative to the phase of a separate transmitted reference, both of which are subject to significant errors as a result of multipath propagation. Measurement of the peak-to-peak frequency shift (or jump) is a measurement of the difference between two consecutive parts of the same waveform; i.e., it does not require any differencing or comparison between the parameter of one signal and an independent reference provided by another separate signal, as measurement of phase does in the other types of VOR.

Specifically, if the take-off angle of the reflected signal relative to the line of antennas is $\theta_r$ and the azimuth of the direct path is $\theta_d$, then the frequency difference (denoted $r$ rad/sec here) between the direct and reflected paths will be $$r = (\Delta\Omega)_{max}(\cos\theta_d - \cos\theta_r) \qquad (18)$$

When the two are combined in the airborne receiver, the instantaneous frequency of their resultant will, prior to the filtering associated with the frequency detection process, differ from the exact frequency of the stronger of the two (i.e., of the direct path) by an amount that fluctuates at a fundamental rate of $r$ rad/sec. The frequency-averaging period in the frequency detector can extend over at least about a half a period of $\rho/2\pi$ Hz, and can certainly be made much longer than this by combining measurements over several cycles of $\rho/2\pi$ Hz. Moreover, the take-off angle from a radiating antenna to a reflector will almost always be sufficiently different from that of the direct path to cause the corresponding doppler frequency shifts to differ by more than 30 Hz. Consequently, the disturbance caused by the multipath on the frequency shift of the direct-path signal can be filtered out almost completely, leaving practically no trace on the measured value of each frequency shift. Accordingly, the resulting average value of frequency for the resultant of the direct-path signal and the reflected components will (over a complete number of periods of the added frequency disturbance) be equal exactly to the actual frequency of the direct-path signal.

For the frequency disturbance caused by the multipath to be infilterable, we must have $$|\cos\theta_d - \cos\theta_r| < 2\rho/n(\Delta\Omega)_{max} \qquad (19)$$

where $n$ is the number of half-periods, $\pi/\rho$ sec, over which the frequency is averaged. The combined roles of the aperture size, $D/\lambda_o$, and the data-smoothing filter bandwidth $2\pi/(n\rho)$ *can be brought out explicitly in condition (19)* by substitution for $(\Delta\Omega)_{max}$ in term of $\rho$ and $(D/\lambda_o)$, which reduces condition (19) to the form $$|\cos\theta_d - \cos\theta_r| < \frac{1}{n} \cdot \frac{1}{\left(\frac{D}{\lambda_o}\right)} \qquad (20)$$

This shows that the detected-frequency output smoothing (or averaging) action, represented by $n$, and the ground antenna array aperture size, $D/\lambda_o$, affect in exactly the same manner the sensitivity of the detected frequency to the multipath errors. For $n = 2$, $\rho/2\pi = 30$ Hz and $(\Delta\Omega)_{max}/2\pi = 3000$ Hz, condition (19) becomes $$|\cos\theta_d - \cos\theta_r| < 1/100$$

Finally, the frequency disturbance goes to zero as r goes to zero. Therefore, when the frequency difference, $r$, is too small to be filterable the error will most likely be too small to be of any consequence.

The property stated above for the average frequency of the resultant of two or more sinewaves of different amplitudes and different frequencies underlies the well-known stronger-signal capture effect in FM.

If the ratio of reflected-to-direct path amplitude is $a < 1$, then the instantaneous peak angular frequency deviation (from the frequency of the received direct-path signal) caused by the reflected path is given by $$\omega_{\epsilon, peak} = \frac{a}{1-a} |\cos\theta_d - \cos\theta_r|(\Delta\Omega)_{max} \qquad (21)$$

Under condition (19), $$\omega_{\epsilon, peak} < \frac{a}{1-a} \cdot \frac{2}{n}\rho \qquad (22)$$

For $a$ on the order 0.1 or less, the instantaneous frequency deviation caused by the reflected path is given by $\omega_{\epsilon, peak}\sin rt$. The worst conceivable condition occurs if the instantaneous peak angular frequency deviation $\omega_{\epsilon, peak}$ occurs at the midpoint of a pulse of the square wave, and $|r| << (2/n)\rho$. The measured direction-dependent frequency deviation will then be shifted from its correct value by $\omega_{\epsilon, peak}$.

It should, however, be evident from Eq. (18) that the condition $r < (2/n)\rho$ for nonfilterable disturbance holds only for values of $\theta_r \approx \theta_d$; specifically, for reflector take-off angles, $\theta_r$, within a sector centered at $\theta = \theta_d$ defined by $$|\theta - \theta_d| \cdot |\sin 2\theta_d| < \frac{2}{n} \cdot \frac{\rho}{(\Delta\Omega)_{max}}, |\theta_d| \neq 0 \text{ or } \frac{\pi}{2}$$

For $|\theta_d| = 0$ or $\pi/2$, $\sin 2\theta_d$ on the left should be replaced by $\sin 2\theta$.

More generally, the presence of a reflected-path signal of relative amplitude $a$ transforms the received signal from the form described by Eq. (1) to $$e(t) = \cos\{[\omega o + \Delta\Omega e_{sq}(pt)]t + \theta(t) + \phi_o\}$$

where $$\theta(t) = \tan^{-1}\frac{a \sin rt}{1 + a \cos rt}$$

Figure 13:
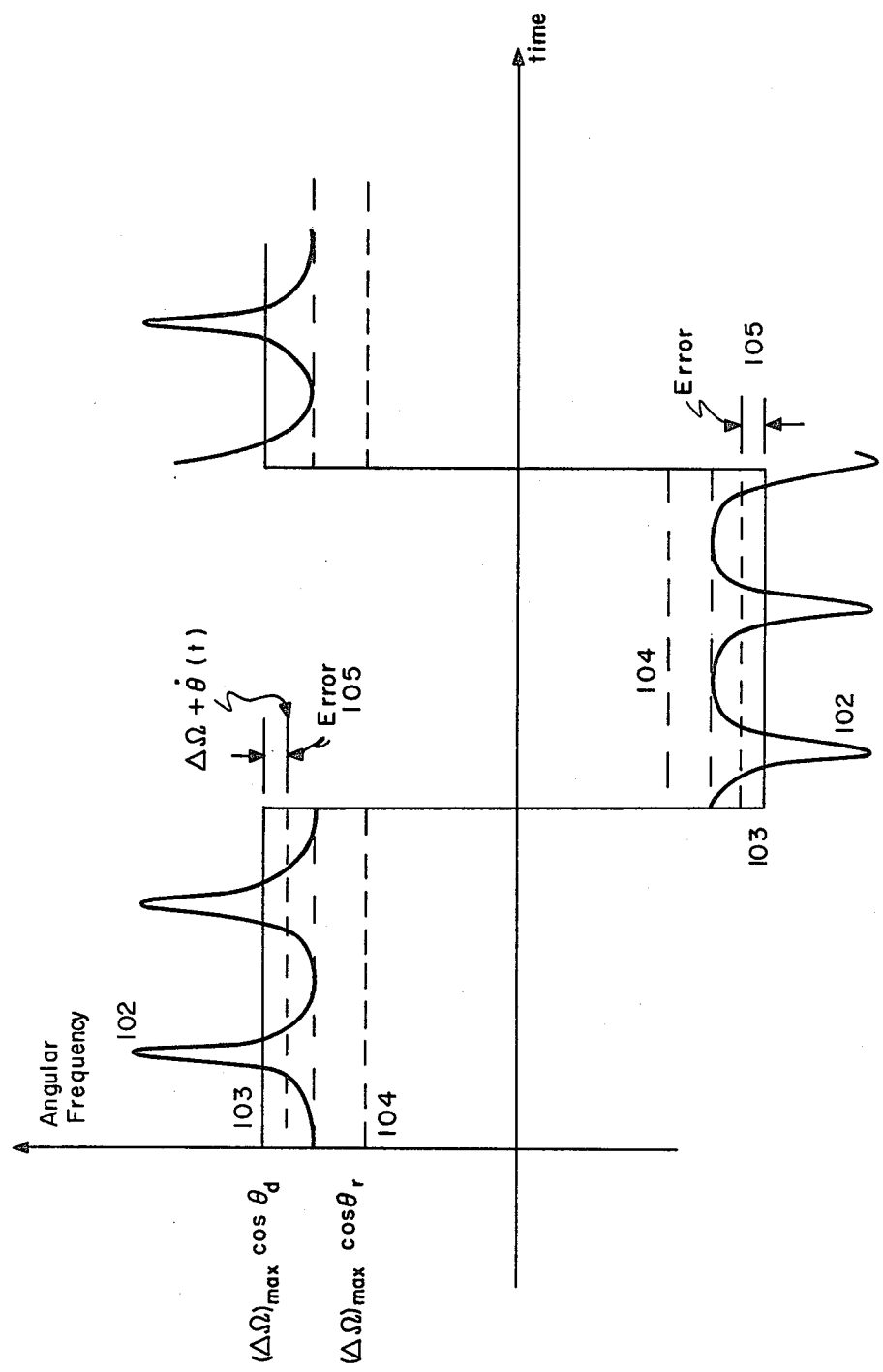
FIG. 13 shows time waveforms representative of instantaneous frequency fluctuations that are caused by the presence of a second reflected propagation path in a system operating in accordance with this invention.

Note that the frequency difference, $r$, is negative for $+\Delta\Omega$ and positive for $-\Delta\Omega$. The resulting instantaneous frequency error is given by $\theta(t)$, the time derivative of $\theta(t)$. A plot of $\theta(t)$ is shown (102) in FIG. 13 for illustration. In FIG. 13, the frequencies 103 and 104 correspond to the direct path and the reflected path, respectively. The average value of $\theta(t)$ over a complete number of cycles of its fluctuations is exactly zero. However, the half-period, $\pi/p$, of the square wave will generally not be an exact integer multiple of the period $2\pi/r$ of $\theta(t)$, and hence $\theta(t)$ may not be averaged over an integer multiple of $2\pi/r$ in the course of measuring the shifts $+\Delta\Omega$ and $-\Delta\Omega$. The section of the frequency error waveform, $\theta(t)$, overlapped by a positive pulse of $e_{sq}(pt)$ has, for $a$, $r$ and $\varphi_o$ holding unchanged, the same average value over the duration of the positive pulse as the section overlapped by a negative pulse of $e_{sq}(pt)$ has over the duration of the negative pulse. Consequently, residual errors 105 in measuring successive $+\Delta\Omega$ and $-\Delta\Omega$ result from the duration of $\pm\Delta\Omega$ not enclosing a complete number of cycles of $\theta(t)$. But, if the averaging process in the measurement is extended over several multiples, $n$, of the half period $\pi/p$, the residual error will be reduced by a factor $1n$.

It is important to observe that when $r > 2p$, a zero average for $\theta(t)$ can be secured by limiting the interval over which $\pm\Delta\Omega$ is counted to an integer multiple of $2\pi/r$. This can be accomplished by detecting either the peaks or the zero crossings of $\theta(t)$. The zeros occur very nearly where the fluctuating value of $\pm\Delta\Omega + \theta(t)$ crosses its average value over the frequency counting period. Alternatively, the determination of a frequency averaging interval encompassing an integral number of periods of $2\pi/r$ can be based on the envelope fluctuations caused by the multipath; e.g., by turning the frequency counting on and off by positive-going or negative-going crossings of a suitably chosen level by the envelope fluctuation.

Figure 14:
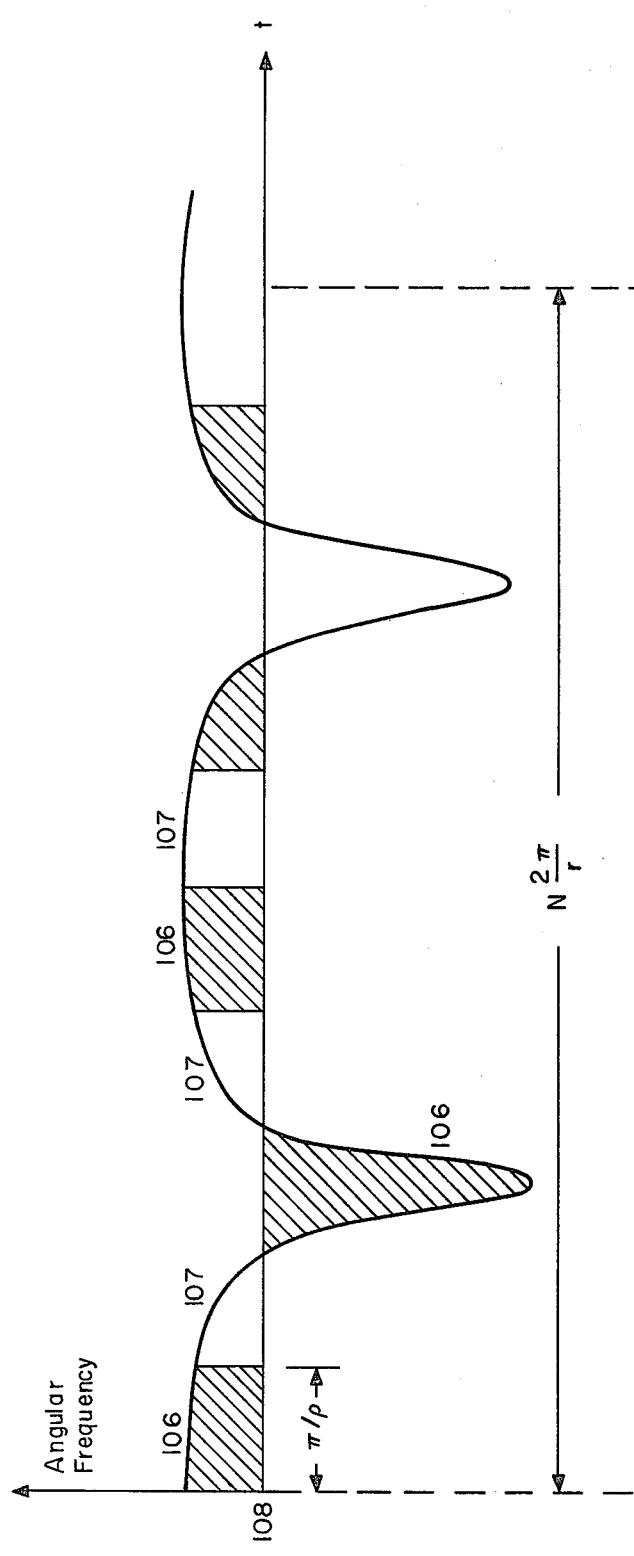
FIG. 14 shows a time waveform representative of the instantaneous frequency fluctuations caused by a second reflected propagation path resulting in a signal that differs a small amount in frequency from the signal arriving on the direct propagation path in a system operating in accordance with this invention.

When $r < 2p$, the conditions are illustrated in FIG. 14. With reference to FIG. 14, the time interval $\pi/p$ can only enclose a fraction 106 or 107 of a complete cycle of the frequency fluctuation caused by the multipath interference. But zero average for this frequency fluctuation can still be secured by averaging over a multiple $n$ of the half period $\pi/p$ such that $n\pi/p = N2\pi/r$, where N is an integer large enough to ensure that the (shaded) areas 106 between the waveform that represents the instantaneous frequency of the resultant of the direct-path and reflected-path signals and the undisturbed frequency 108 of the direct path balance out above and below the direct-path frequency 108. Such an averaging interval can be determined again as the separation between some number of positive-going or negative-going crossings of some level by the frequency, or by the corresponding envelope, fluctuations. Note, however, that since the value of $n$ is determined by $n = 2Np/r$, $m$ is generally not an integer. In effect, this determination of $n$ ensures in cases where $r < 2p$ that what is omitted in positive area under the frequency disturbance waveform is balanced out by omission of negative area, so that the overall result yields a zero average error.

From the preceding analysis and the theory of capture in FM, we conclude that for good rejection of multipath, the higher the frequency deviation, the more effective the FM capture effect. Furthermore, the larger the difference between Doppler shifts of desired signal and secondary paths the more immune is the capture of the direct path. Therefore, in order to ensure the conditions most favorable to the error-free capture of the direct-path signal, the line of antennas should be oriented so that the reflector, or reflectors are on one side or the other of it, so that when an aircraft is traversing a radial roughly in line with the particular line of antennas, it perceives near-maximum Doppler shift and the reflection must traverse a path that makes an angle with cosine near zero; i.e. an antenna line orientation such at $\theta_r$ is around $\pi/2$.

If more that one line of antennas is allowed, then each may be oriented to provide least sensitivity in a particular sector to reflections from a particular site feature. Since only one line is necessary for the bearing measurement, a navigator with full knowledge of the exact orientations of the rectilinear arrangements, and of the site characteristics, can base his measurements on the signal from the most favorable line.

When more than two rectilinear arrays are used in any one ground station, then they can be identified either by their operating frequencies, their repetition rates, their lengths, some distinctive feature of the commutation among antennas, or an identifying code radiated as a frequency modulation every some specified number of cycles of the repetition rate.

In conclusion of the preceding discussion, we recall that the peak-to-peak frequency shift in the Rectilinear DVOR is immune to any effects (such as aircraft motion) that only change the average value of the square wave. In view of this and of its immunity to interference, Rectilinear DVOR is absolutely free of zero-shift errors or of run-out error due to any probable reason; a property that no other type of VOR system based on phase measurement can absolutely have.

Rectilinear arrangements can be superimposed on circular arrangements, even with some of the antennas shared, to obtain a dual type of station with a rectilinear system that is compatible with the circular DVOR system.

Compatibility of Rectilinear DVOR with the Circular DVOR in common use can be assured by means other than a difference in the operating frequencies, as follows.

First, if we choose the same 9.96 kHz subcarrier and 30 Hz repetition frequency for the Rectilinear DVOR as in use for the Circular DVOR. it is possible to use the same antenna commutation distributor for both. The added rectilinear system could be very wide-aperture (e.g., with $D/\lambda_o = 50$) and employ the same number of antennas per line as the circular conventional or narrow-aperture ($D/\lambda_o \approx 5$)DVOR system. In that case, the maximum frequency deviation for the rectilinear signal will be $\pm 3000$ Hz. It will therefore hop at maximum deviation from nearly 7 kHz to nearly 13 kHz and hence it will present no threat of interference to anything below 7 kHz, including possibly a 6.480 kHz precision reference subcarrier such as is used in Precision DVOR (or PDVOR). There will also be no interference with the 9.960 kHz subcarrier (carrying the direction-dependent Doppler modulation) of a Circular (DVOR or PDVOR) system as long as the frequency deviation of the Rectilinear DVOR system exceeds ±30 Hz, particularly if the Rectilinear DVOR signal is radiated a few dB below the level of the Circular DVOR signal. For frequency jumps below ±30 Hz, unfilterable interference with the extracted 30 Hz sineways (with direction-dependent phase) of the Circular DVOR will be so low as to be utterly insignificant (because of the very effective stronger-signal capture effect of FM with a deviation ratio of 16).

A practicable Rectilinear DVOR system implementation will now be described, for further clarification, in terms of a Rectilinear DVOR system that employs two orthogonal rectilinear arrangements of antenna elements (although with a correction or calibration added, not necessarily precisely orthogonal) in which an unmodulated sinusoidal radio-frequency signal is commutated from element to element (smoothly, through an appropriate blending function) so as to induce a Doppler frequency shift at the position of a distant observer, such as an aircraft in which the VOR receiver is installed. With specific reference to FIG. 4, if the apparent position of the transmitting source moves along a rectilinear path 34 in one direction, then moves back in the opposite direction, the result at the observer's position is a frequency-shift modulated (FSM) signal with a period equal to the time it takes to make a round trip from any given starting antenna element through all other antenna elements back to that same starting element. For purposes of illustration and compatibility with the existing DVOR signal format, this period is chosen to correspond to a repetition frequency of 30 Hz (although it could be some other value).

Figure 10:
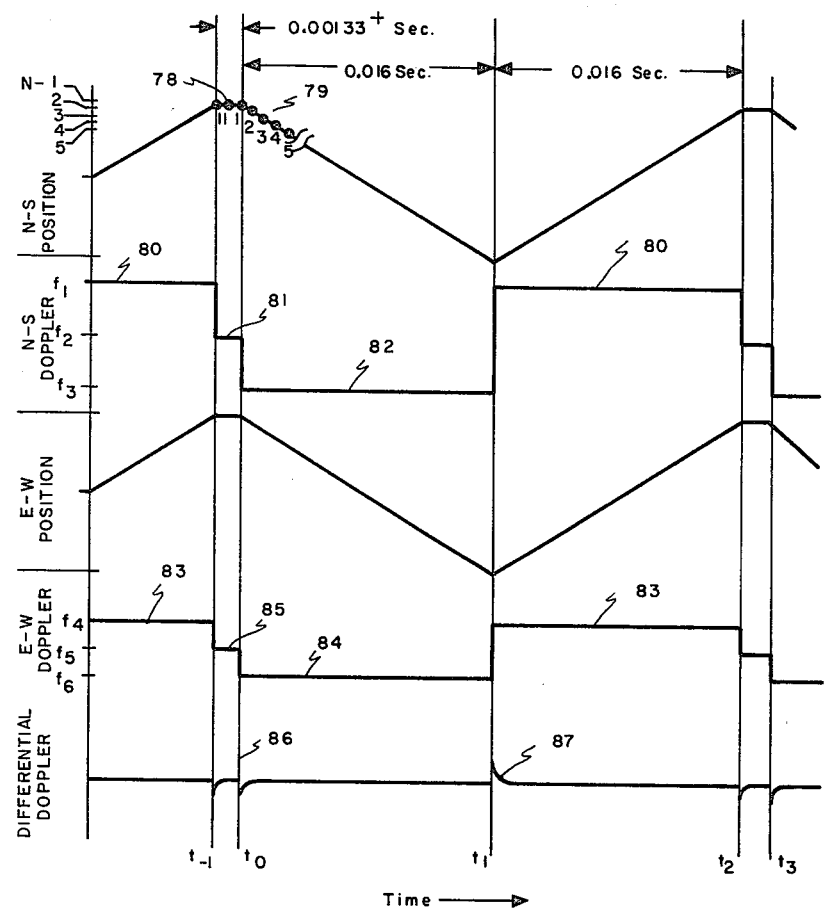
FIG. 10 shows time waveforms for the motion of a radiating source and for the resulting induced Doppler frequency shifts, illustrating one method of time tagging the source motion and the resulting received frequency shifts to indicate the sense or sign or the source motion relative to a known reference direction, in accordance with this invention.

A second unmodulated sinusoidal radio-frequency signal is commutated through the orthogonal line of antennas 35 in the same manner as just described to produce a second FSM signal. This second signal is used in the bearing computation and serves to resolve ambiguity and correct errors due to elevation angle of the distant navigating observer relative to the plane of the ground antenna arrays 34 and 35. The addition of a time reference that identifies the direction of the source motion versus time provides the necessary information to measure bearing unambiguously from 0 through 360°. Such a time reference may be conveniently added in a number of ways; e.g., by effectively stopping the signal source motion momentarily at one end of the linear array (which can, for example, be accomplished by commutating the end antenna by means of a Multiport Coupler 32 and 33 through several segments of the RF Distributors 29 and 30 as illustrated by FIG. 10), or by arranging the commutation connections so that the simulated source motion appears to slow down over a few elements to rest at the reference end elements, and so forth.

The separate direction-dependent signals received by the distant observer are subcarriers that are squarewave FM (or FSM) modulated by the Doppler resulting from the simulated motions of the sources. Note that each signal is independent, or self-referencing, and thus the two signals do not relate to each other (and are not interdependent on each other for system accuracy) in the manner in which the direction-dependent and the reference subcarriers do for Circular DVOR.

Again, for a specific practical implementation, the two subcarriers are chosen to be centered at $f_o + 9.96$ kHz and at $f_o - 17.7$ kHz. The determinants of the choice of the higher Rectilinear DVOR subcarrier frequency above the carrier frequency $f_o$ are: a) The requirement for avoiding overlap with communication channels and DVOR phase reference components occupying the frequency range between $f_o$ and $f_o + 7$ kHz; b) The Doppler-shift frequency spread (e.g., up to ±3 kHz); c) The upper deviation limit of the Rectilinear DVOR $f_o + 9.96$ kHz subcarrier; and c) The maximum allowable baseband bandwith of the VOR receiver (25 kHz). The 9.96 kHz signal can be generated by a Circular DVOR Sideband Transmitter 41 emanating a CW sideband signal at a frequency 9.96 kHz above the DVOR carrier frequency $f_o$. This DVOR Sideband Transmitter 41 output is commutated through a rotating switch 29 driven by motor 31 to a rectilinear arrangement of antennas 35 of length equal to fifty times the wavelength of the carrier at $f_o$ Hz (i.e., $D/\lambda = 50$). The resultant received signal at the VOR receiver, detailed in FIG. 5, is a Doppler-induced FSK/SSBAM signal centered at a baseband frequency (after AM demodulation 53) of 9.96 kHz. The frequency deviation of the received 9.96 kHz subcarrier is a cosine or a sine function of VOR bearing angle, with a maximum deviation in the example system of approximately ±3 kHz.

The 17.7 kHz signal is also generated by a second Circular DVOR Sideband Transmitter 46, but at a frequency 17.7 kHz below the carrier frequency, $f_o$. The sideband is chosen in the example practical system, to be below the carrier to prevent cross-modulation components in the frequency range of the 30 Hz VOR reference and the voice band which would occur in the receiver AM demodulation 53 if both subcarriers were transmitted as upper sidebands. This signal is commutated to a second rectilinear sequence of antenna elements 34 arranged in an East-West line. The resultant E-W transmitted signal will be FSK/SSBAM with received frequency deviation proportional to the sine or cosine of the VOR bearing angle. The two rectilinear signals can be quite easily linearly summed in the airborne receiver with the other DVOR signal components, the only constraint for compatibility being that the Rectilinear DVOR $f_o + 9.96$ kHz signal be transmitted about 3 dB lower in amplitude to allow complete strong-signal capture of the Circular DVOR $f_o + 9.96$ kHz FM signal for normal processing by a conventional VOR receiver.

Specific reference is now made to FIG. 8 to illustrate the composite RF spectrum for the example Rectilinear DVOR signal combined compatibly with Conventional VOR or Circular DVOR signals. The corresponding AM demodulated baseband spectrum is illustrated in FIG. 9. In FIG. 8 and FIG. 9, spectral distributions and limits for both N-S and E-W Rectilinear DVOR signals are indicated in a manner intended only to clarify the discussion here rather than reflect their appearances accurately.

Maximum use is made of Circular DVOR equipment in the above illustrative practical Rectilinear DVOR system implementation. The only signals required to be transmitted are the $[f_o - 17.7$ kHz$]$ CW sideband signal, the Circular DVOR carrier, $f_o$, and the $[f_o + 9.96$ kHz$]$ CW sideband signal. With reference again to FIG. 4, Sideband Transmitter 41, with Automatic Frequency Control 42, generates the $[f_o + 9960$ Hz$]$ CW sideband, and can be an existing Circular DVOR Sideband Transmitter. The output of this transmitter 41 is coupled through the Distributor Assembly 40 to rectilinear antenna array 35. The RF distributor can be a regular Circular DVOR distributor 29, with or without appropriate modification to realize the blending function illustrated in FIG. 6. A Circular DVOR Caarrier Transmitter 37 and Power Divider & AM Modulation Eliminator 38 provide the carrier signal through the Modulation Bridge 39 to the omnidirectional carrier antenna 36.

A second Sideband Trasmitter 47 with Automatic Frequency Control 45 provides the sideband signal at $[f_o - 17.7$ kHz$]$ and is coupled through a second distributor 30 within the Distributor Assembly 40 to the E-W orthogonal rectilinear arrangement 34. Note that no stringent mechanical alignment is required between the two RF distributors 29 and 30 for the Rectilinear DVOR system (or between the Disbributors for Rectilinear DVOR and the distributor for a collocated Circular DVOR in a compatible combined operation).

In a ground station wherein compatible combined operation of Circular and Rectilinear DVOR is required, all other signal components are added as in a normal Circular DVOR ground station. In such a combination, the same $[f_o + 9.96$ kHz$]$ sideband signal may be coupled to both the Circular DVOR antenna sequence and to one of the rectilinear sequences of the Rectilinear DVOR system and the same modified blending function of FIG. 6 may be provided to both arrangements of antennas. In addition a specific ratio of transmitted signal amplitudes may be set to ensure proper capture of either type of signal in the VOR receiver.

The conventional VOR/DVOR receiver can be utilized to receive a Rectilinear DVOR signal if an adaptor is attached to it that performs the necessary signal processing functions, such as is illustrated in the block diagram of FIG. 5. With reference to FIG. 5, the two FSK/SSBAM subcarriers are extracted from the output of the AM Detector 53 of the conventional VOR/D-VOR receiver and are applied to N-S and E-W channels, with subcarrier center frequencies of 9,960 Hz and 17,700 Hz, respectively. These channels consist of subcarrier predetection bandpass filters 54 and 55, limiters 56 and 57, and wideband pulse-count discriminators 58 and 59 for demodulation (and for timing signal development) of the Rectilinear DVOR FSM signals.

Outputs from the limiter stages 56 and 57 are also coupled directly to separate N-S and E-W frequency counters 61 and 62. With reference to FIG. 10, the N-S frequency counter measures the count first of one Doppler-shifted frequency, $f_3$, 82 due to apparent source motion from North to South in the interval $t_0$ to $t_1$, then another Doppler-shifted frequency, $f_1$, 80 due to apparent source motion from South to North in the interval $t_1$ to $t_2$. With reference to FIG. 7, these frequencies are measured digitally by counting the number of zero-crossings of a precision crystal oscillator 71 at, for example, 10 MHz in a discrete number of full cycle counts of $f_3$ 82 during the intervals $t_0$ to $t_1$ and $f_1$ 80 during the interval $t_1$ to $t_2$. The frequency counts so measured are stored in binary form in 73, then are divided digitally into the binary count representing the discrete number of accumulated Doppler-shifted frequency cycles. The resulting digital quotients represent the two freqencies, $f_1$ 80 and $f_3$ 82. The difference between these quotients is proportional to the cosine of the angle $\psi$ between the line-of-position (LOP) intersecting the Ground Station center and the projection of the aircraft position on the plane of the ground antenna arrangements, and the N-S axis, times the cosine of the elevation angle $\alpha$; i.e.

$$f_3 - f_1 \propto \cos \psi \cos \alpha \tag{24}$$

The output signal from the 17,700 Hz limiter 57 is coupled to the E-W Frequency Counter 62 for processing in a fashion identical to that described above for the N-S digital channel. With reference to FIG. 10, the E-W Doppler-shifted frequencies are $f_4$ 83 and $f_6$ 84, and $$f_6 - f_4 \propto \sin \theta \cos \alpha \tag{25}$$

A digital division of Eq. (25) yields $$\frac{f_6 - f_4}{f_3 - f_1} = \frac{\sin \theta}{\cos \theta} = \tan \theta \tag{26}$$

Note that in the division process the $\cos \alpha$ term drops out, making the computation independent of the elevation angle, $\alpha$. Since, as pointed out earlier the peak-to-peak deviations, $f_3 - f_1$ and $f_6 - f_4$, are independent of any motion of the receiver, the computation of Eq. (26) is also independent of receiver motion.

Referring again to FIG. 5, a digital arctangent computation 64 is performed on the storage register in 63 containing the quotient of Eq. (26). This computation can be implemented in terms of an arithmetic algorithm or a "lookup table" with linear interpolation, whichever requires the least logic circuitry. The arctangent computation 64 output is transferred to the bearing decimal display 65, which may, for example, be a 5-digit decimal readout separate from the VOR receiver, providing a display resolution to $\pm 0.01°$.

Timing signals developed in the "TIMING" block 60 of FIG. 5 are initiated by a differentiation of the discriminator outputs in the N-S and E-W channels. The pulses 86, 87 so derived operate into logic circuits that conrol transfer functions, arithmetic commands, counter resets, etc., in the N-S and E-W frequency counters 61 and 62, NS ÷ EW logic 63, arctangent computer 64, and the VOR bearing decimal display unit 65. The differentiated pulse signals 86 are the result of the halt in apparent source motion by commutation of antenna number one in both N-S and E-W lines 35 and 34 on three successive segments of the RF Distributors 29 and 30 by means of 3-Port Couplers 32 and 33. This commutation scheme is employed on both N-S and E-W subcarrier sideband transmissions to mark the direction of apparent source motion at the observer's position for use in direction ambiguity resolution. The other ambiguity resolving factors are the signs of $[f_6 - f_4]$ and $[f_3 - f_1]$ computations. The differentiated pulse signals are OR'ed so as to provide sense of source motion at all bearings including cardinal bearings.

The signal sampling replicas at the output of the AM Detector 53, caused by sideband commutation from antenna to antenna, are assumed in the above example of a practical system implementation to be adequately suppressed by the combined effect of blending function design and strong-signal capture in the subcarrier predetection limiters 56 and 57.

In a Rectilinear DVOR system combined with a Circular VOR system, the Limiter 56 in the 9960 Hz subcarrier channel may be replaced with Baghdady weaker-signal capture in circuitry 56, since the desired Rectilinar DVOR subcarrier is lower in transmitted level than the Circular DVOR 9960 Hz direction-dependent subcarrier.

The Rectilinear DVOR receiver design described above for illustrating a practical implementation emphasizes the use of digital techniques and circuits to provide accuracy and stability unrealizable by analog methods. The all-digital signal processing design is amenable to economic production methods, such as LSI, and does not require painstaking calibration after manufacture. LSI implementation would decrease the size, weight, and power consumption to negligible levels, relative even to single-engine or light twin aircraft. Digital autopilot and automatic navigation system pickoffs could also be used without reqiring analog-to-digital conversion, since the signals would already be available in digital format. (Simple digital-to-analog converters could be provided for analog output signal requirements, such as meter displays, etc.)

An unmodified conventional VOR/DVOR receiver can also extract the directional information from the Rectilinear DVOR signal if the conventional VOR 4-loop signal is transmitted simultaneously by the Rectilinear DVOR station and the Rectilinear DVOR frequency-shifted signal is used as the reference-phase signal by extracting the fundamental 30 Hz tone of the 30 Hz square-wave from the output of the receiver FM discriminator. Alternatively, if the ground station is a combined Circular DVOR and Rectilinear DVOR station, a 30 Hz tone extracted from the $f_c - 17.7$ kHz Rectilinear DVOR subcarrier will provide a precision phase reference signal (relatively immune to siting effects) for PDVOR operation.

Other practical ways for the implementation of the Rectilinear DVOR system include the time sharing of one Sideband Transmitter between N-S and E-W antenna sequence systems, and the use of a higher commutation rate (such as 60 Hz) to increase the Doppler frequency shift.

As noted earlier, when the receiver is operated in a rapidly-moving vehicle, the Doppler effect due to the vehicle motion will produce changes in the received frequency of the beacon signal. Such frequency changes will not interfere with direction finding, but will only result in an apparent detuning of the receiver. The effect of this apparent detuning depends on the speed of the vehicle relative to the speed of transversal of the ground line by the radiating source. If the speed of the rectilinearly moving ground source is much higher than the speed of the vehicle relative to the line of motion of the radiating source, then the detuning effect of aircraft motion can be removed by AFC based on the average between the two frequencies associated with the source motion.

As previously stated, one of the objects of this invention is to provide a convenient method for transmitting calibrating signals from the beacon transmitters in a radio navigation system. In a Rectilinear DVOR system, the calibration signal can be used to calibrate the measured frequency shifts relative to the direction of approach along the antenna line of motion. The transmission of a calibrating signal is also particularly useful whenever the radiated signal is changed from time-to-time to prevent unauthorized use of the transmissions or to provide a method for station and array identification. In those cases where a reference signal is produced locally within the receiver rather than transmitted, it is almost essential to accurate operation that calibrating information be transmitted.

A calibration reference signal can be provided by radiating from one centrally located antenna, perhaps the point of intersection of two lines of motion, an FSK subcarrier with $\pm\Delta\Omega$ equal to the maximum observable value when the receiving platform approaches the station along one of the lines of antennas. Such a subcarrier can be amplitude modulated on the main carrier. It will be apparent from the foregoing that the calibration reference signal provides redundant data where a known, stable carrier frequency is employed in a system in which the radiating or receiving positions move back and forth along a line of motion.

Figure 11:
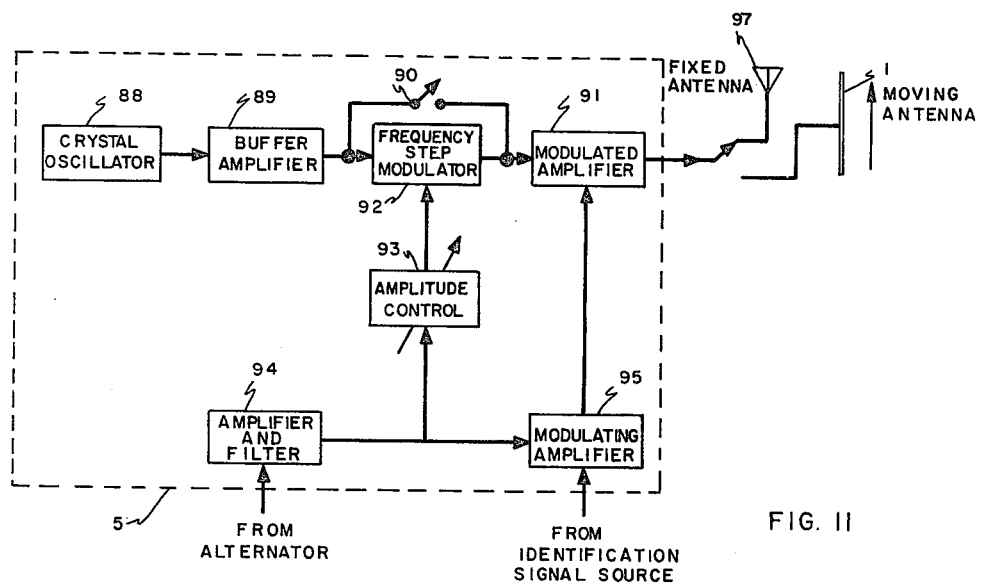
FIG. 11 shows a more detailed block diagram of the transmitter of FIG. 1, including, in addition, an arrangement for transmitting a calibrating signal in accordance with this invention.

A simple and convenient means for transmitting a calibrating signal is illustrated in FIG. 11 which is a detailed block diagram of the transmitter 15 shown in FIG. 1. In normal operation, a carrier signal is derived from oscillator 88, amplified by the buffer amplifier 89 and then impressed upon the modulated amplifier 91. Switch 90 is normally closed to bypass the frequency-step modulator 92. A reference signal from alternator 6 of FIG. 1 is passed through an amplifier and filter 94 and then impressed upon the modulating amplifier 95. The output of the latter amplifier is utilized to control the modulated amplifier 91. The modulated output of amplifier 91 is supplied to the moving antenna 1 of FIG. 1 or to the commutated antenna sequence such as line 28 illustrated in FIG. 3.

Now, to transmit a calibrating signal, the output of the modulated amplifier 91 is switched from the moving antenna 91 to the fixed antenna 97. This removes the direction-dependent frequency-step modulation of the transmitted signal normally produced by the Doppler effect. Next, switch 90 is opened. The carrier excitation supplied to amplifier 91 is thereby passed through frequency-step modulator 92 where it is frequently modulated by a portion of the reference signal which has been passed through an amplitude control 93. The frequency-step modulation produced in this manner has an arbitrarily fixed frequency-step magnitude relative to the reference signal which can be varied at will by adjusting the amplitude control 93. While such a calibrating signal is being transmitted, the zero setting control of meter 27 in the remote receiver of FIG. 1 can be adjusted to produced a zero-degree reading on the direction indicator 27 or any other arbitrary calibration reading which may have been agreed upon. In the cases where the reference signal is generated locally, a similar amplitude control can be employed to facilitate calibration.

Up to this point, we have described an invention in which the signal is radiated by an antenna that is made to execute a controlled motion back and forth along a straight line of some defined length or is commutated along a linear arrangement of stationary antennas, and the receiver is attached at a stationary position relative to some distance navigating craft. In a variation of this invention, which we label here the "Reverse Rectilinear DVOR" or the RRDVOR, the roles of transmitter and receiver are interchanged; that is to say, at least one receiving position is repetitively moved along a line of motion having a predetermined, fixed location in the frame of reference. The receiving position may be moved by moving a receiving antenna back and forth on the surface on which it is mounted, or such motion may be simulated by a process of commutation of the receiver input among plural antenna elements arranged along the line of motion, and the signal is radiated by an antenna mounted in a fixed position on the surface carrying it. In this variation on the present invention, the receiving antenna position relative to the surface carring it may be moved back and forth along a straight line, or it may be moved along an open or closed, rectilinear or curvilinear line of motion; alternatively, said motion may be simulated by commutation of the receiver input among antennas arranged along any of the aforesaid lines of motion.

In yet another variation on this invention, the transmitting antenna and the receiving antenna both execute precisely controlled motions relative to the surfaces on which they are mounted, or such motions may be simulated in either or both cases by commutation among discrete antennas mounted on the respective surfaces. This variation may, for convenience, be referred to as Bi-VOR.

In either the RRDVOR or the Bi-VOR variations on the basic RDVOR invention, the theory of operation and the design principles are similar to those employed earlier in this disclosure in describing the RDVOR invention, and can be readily detailed by those versed in the art to bring out the special performance capabilities and characteristics of RRDVOR and Bi-VOR and to determine the equipment design specifications for the implementation of each type of system.

Figure 15:
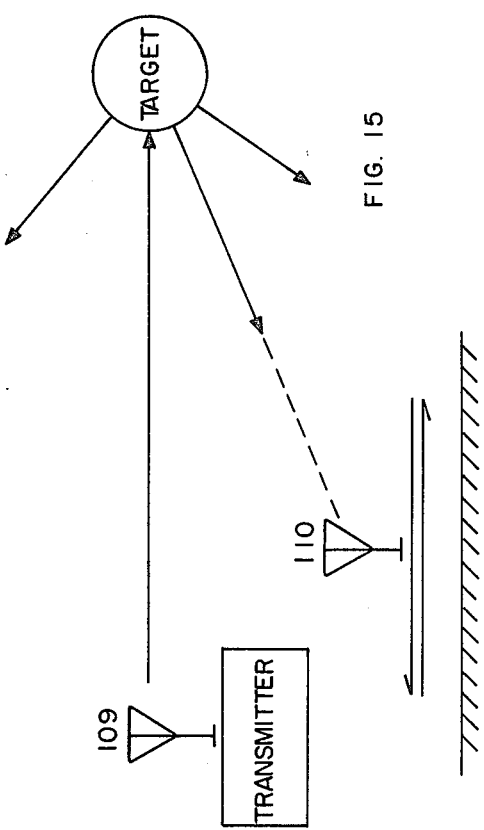
FIG. 15 shows a configuration in which a system operating in accordance with this invention can be used to determine the radial to a passive (non-radiating) object or target.

In yet another variation on the invention described herein, a system based on the RDVOR, RRDVOR or Bi-VOR principles can be configured as illustrated in FIG. 15. With reference to FIG. 15, the transmitter 109 and the receiver 110 may be either collocated or they may be widely separated, mounted either on the same surface or object, or on separate objects. the receiver receives signals scattered by a target object 111. It may also be desirble in some applications to have the receiver receive simultaneously a direct signal from the transmitter and a signal scattered by the target and operate on both to derive data by comparing the characteristics of the two signals.

In yet another variation on the basic invention described herein, each line of motion or each line of antennas in all of the preceding discussions is replaced by two parallel lines, one next to the other, to create or simulate a radiating source or a receiver moving relative to its platform in two opposite directions at the same time with the same or with different speeds. This creates in the receiver two frequency-shift modulated signals differing in frequency, at all but the instants corresponding to the occurrences of the frequency jumps, by a constant frequency proportional to $\cos \alpha \cos \theta$ for one orientation of the lines (say, N-s) and $\cos \alpha \sin \theta$ for the orthogonal orientation (E-W). This frequency difference will be of the same sign and can be counted directly, rather than determined as the difference between separately counted frequencies. For convenience, a system implemented with double antenna lines as just described can be referred to as a "double-line RDVOR" to distinguish it from the single-line systems described in the earlier paragraphs of this disclosure.

Many variations on the basic RDVOR techniques described and illustrated above can also be made without departing from the basic concepts and scope of this invention. For specific examples, the following may be noted:

(a) The same radiating source and/or receiver can execute prescribed motions along more than one line during alternate time intervals.

(b) A given line of motion may be traversed in only one direction; but traversing the line in alternate directions, back and forth, yields a self-referencing frequency-step modulation.

Figure 19:
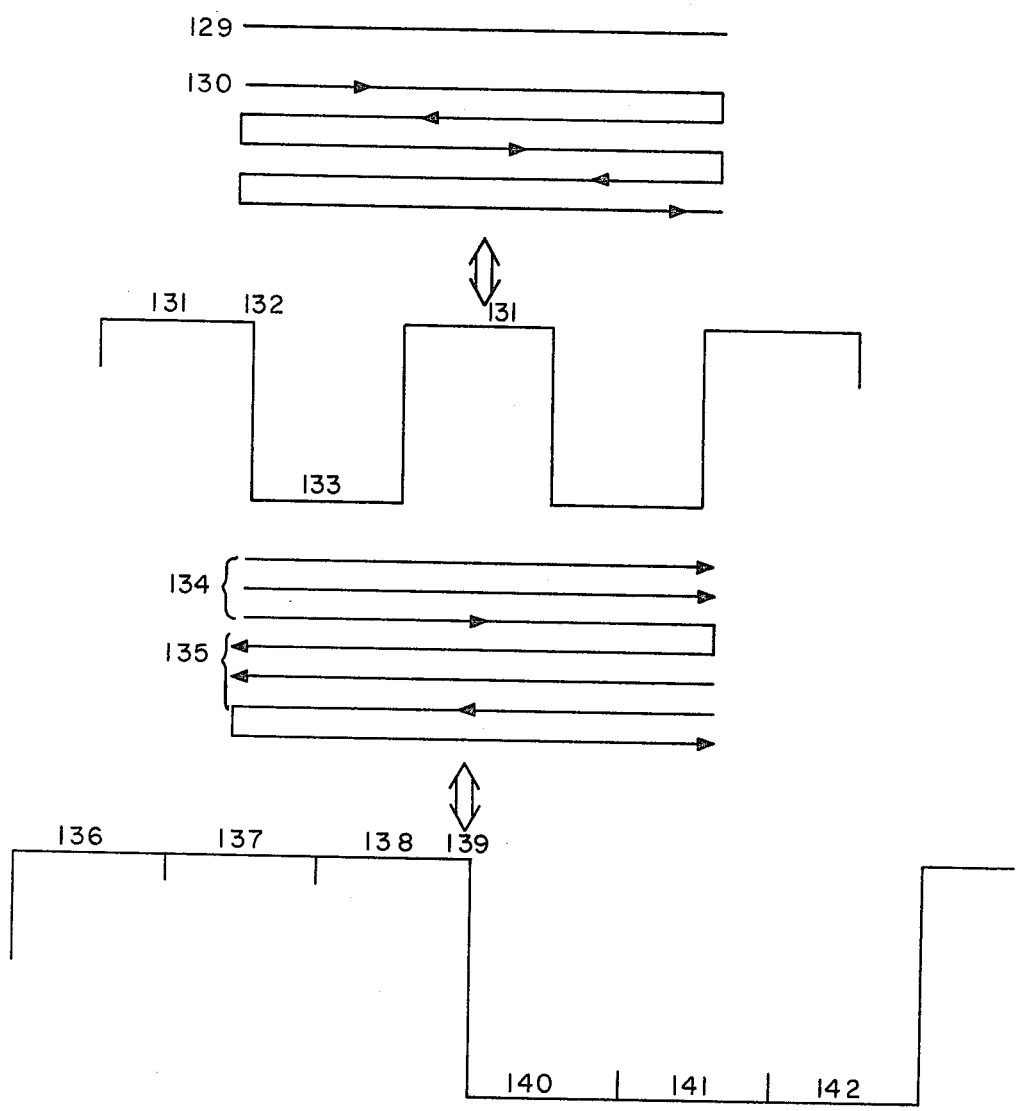
FIG. 19 shows an illustration of alternative ways in which a line of motion can be traversed by an antenna (in a transmitting or a receiving mode) and the corresponding Doppler frequency shift waveform, in accordance with this invention.

(c) A line of motion, such as 129 in FIG. 19, can be traversed in the alternating manner illustrated in a conveniently revealing manner by 130 in FIG. 19, which would result in the rectangular frequency-variation waveform illustrated by the periodic repetition of the successive frequency value 131, frequency jump 132 to the value 133 and back to 131. In such a case, the waveform of the frequency modulation is of exactly the same repetition frequency as the alternating motion of the source or the receiver. However, the motion can be made to follow the pattern illustrated in FIG. 19 by a number of successive repetitions 134 of the traversal of the line in one direction, followed by the same or different number of successive repetitions 135 of the traversal of the line in the opposite direction. In this latter case, the frequency-modulation waveform would follow the equivalent values 136, 137 and 138, and jump at 139 to the values 140, 141, 142. Repetition of this pattern yields a frequency-modulation waveform with a period equal to six periods of each traversal of the line 129. The repetition frequency of position motion in the illustration 134, 135 in FIG. 19, equals the third harmonic of the frequency of alternation of the velocity (and, hence, of the induced frequency shift).

(d) Each antenna line may be subdivided into sections to be traversed in various pre-determined sequences. Moreover, the beacon transmitters can, in general, be operated in connection with two or more spaced pairs of crossed lines so that a ship or aircraft equipped with a receiver can obtain a position "fix" by triangulation. It may sometimes be convenient to operate these transmitters in fairly rapid sequences on the same frequency. Moreover, since the directional information is implicit in the frequency deviation of a sinusoidal low-frequency signal obtained from the receiver, the design of automatic plotting or automatic position-computing apparatus for use with the navigation system described herein is greatly facilitated.

Controlled rectilinear motion of an antenna can be performed in a variety of practicable ways. In one method, illustrated in FIG. 16, the antenna 112 rests on two cogged wheels (113 and 114), and protrudes above a counterpoise 119 through a rectilinear groove 118. Coggwheel 113 is engaged by coggs or sawteeth covering one-half of a belt 115, driven by a motor 117 and arranged to move the antenna mount 112 to the right. Coggwheel 114 is engaged by coggs or sawteeth covering one-half of a belt 116, driven by the same motor 117 as belt 115, and arranged to move the antenna mount 112 to the left as soon as the antenna reaches the right end of the intended line of motion. The line of motion is defined by a groove 118 in the counterpoise plane 119. The non-cogged half of each of belts 115 and 116 is smooth so that the corresponding cogged wheel will only roll on it while the other cogged wheel is engaged by the coggs on the cogged half of its corresponding belt. The belts 115 and 116 are turned by motor 117 in opposite directions, and are so arranged that at any one time only one of the belts has its coggs engaged to its corresponding cogged wheel while the other presents only its smooth toothless section to its corresponding cogged wheel. Thus, when the antenna reaches an end of the line, the teeth on the driving belt run out and the same instant the teeth on the opposite belt appear on the top side of that belt, engage their corresponding cogged wheel, causing the antenna now to move in the opposite direction In an alternative design of the scheme of FIG. 16, the cogged wheels (113, 114) are replaced by roller bearings, and each of the belts (115, 116) has only one sawtooth that engages a cogg on its side of the axle of the roller bearings. The sawtooth of each belt is arranged relative to that of the other in such a way that one belt moves the antenna mount along the groove 118 from one end of the line to the other, and at each end the driving sawtooth slips off and the opposite sawtooth appears on the other belt to drive the antenna mount in the reverse direction along the line.

In yet another method illustrated in FIG. 17, only one belt 120 is employed to produce the reciprocating rectilinear motion of the antenna 112. The antenna 112 is mounted on a counterpoise disc 121, and the mount has a downward protrusion 122 that fits in a frictionless manner into a rectilinear groove 123 that forms the desired line of motion. The attachment 124 can be either a rigid attachment to the counterpoise disc 121 on the outside of the belt, or a magnet mounted rigidly on the outside surface of the belt which attracts and pulls the disc with it. The disc 121 rotates at each end of the line.

In yet another method, one may use a combination of motor-driven cams, which in turn drive a piston back and forth within a sleeve, in an adaptation of the well-known mechanical mechanism of reciprocating piston engines. The sleeve guides the motion of the piston in accordance with the desired line of motion of the antenna. The antenna is mounted on the moving piston, and protrudes through a rectilinear groove in the sleeve.

With reference to FIG. 18, a second antenna that executes rectilinear motion orthogonal to the first one is conveniently arranged as in 125 to move within a groove that forms a T or an L with the line motion of the first antenna. FIG. 17 illustrates also possible arrangements 126, 127, and 128 for double-line systems in accordance with this invention.

Although the RDVOR invention has thus far been illustrated in terms of radio frequencies in the ranges commonly referred to as VHF and UHF, embodiments of this invention can actually be realized at any frequency desired for this purpose. Indeed, for many practical applications, the choice of operating frequency may be determined on the basis of practical considerations related to the availability of frequencies for the intended purpose, and/or the availability of operational "off-the-shelf" equipment that can be employed for most of the signal transmitting, receiving and processing functions to obviate the need for costly new equipment development.

It is important to observe that in the architecture of a navigationaid or direction-finding system based on RDVOR or Reverse RDVOR principles, the only component subsystems that distinguish the RDVOR from the other types of electronic instrumentation (navigation aids, tracking, telemetry, command) systems, and hence may require specialized equipment are
  (i) The antenna and associated antenna-moving or commutation system;
  (ii) The frequency counting subsystem; and
  (iii) The data processing system (hardware and software).

All RDVOR hardware and software requirements are entirely within the state-of-the-art of proven and operational technology, and no areas of development risk can be anticipated for practical applications. Indeed, if a Reverse RDVOR tracking system is specified to operate in certain frequency ranges in which operation, range or field qualified hardware is already in extensive use for other purposes, a very substantial reduction in development costs and risks could be realized by maximizing the use of such equipment.

For example, much proven hardware can be used directly, or with relatively minor adaptations, if an operating frequency is sepecified in the
  (a) 108 to 118 MHz FAA NAVAIDS frequency range, for which omni-antenna elements (Alford loops), doppler VOR distributors, VOR receivers and transmitters and other ancillary hardware are directly usable or adaptable for RDVOR implementation.
  (b) in the VHF bands widely employed for tracking (135 MHz to 140 MHz) and for telemetry (below 300 MHz), a wealth of proven and operationally qualified hardward can be drawn upon, including beacons, transponders, receivers, command transmitters and receivers, antenna elements, etc.
  (c) Similarly, in the 960 MHz to 1216 MHz TACAN/DME and at C-Band ($\sim$ 5000 MHz) and X-Band ($\sim$ 10,000 MHz).
  (d) At L-Band (around 1800 MHz) and at S-Band (2000 - 2300 MHz), operationally qualified equipment in all of the categories listed under (b) is available.

In all cases, the only critical areas that may require special equipment design are those listed in the opening paragraph. Otherwise, and specifically, existing VHF or UHF communcation and telemetry transmitters and on-board antennas can be used directly as Reverse RDVOR beacon transmitters; existing VOR and other VHF and UHF telemetry receivers at least down to the IF prelimiter or post-limiter output are directly usable; and virtually all of the data processing and data communication hardward is off-the-shelf operational. Frequency sources of adequate stability are also off-the-shelf items, as are certain frequency counters which may well be applicable if the available flexibility of RDVOR design is suitably exercised.

Figure 20:
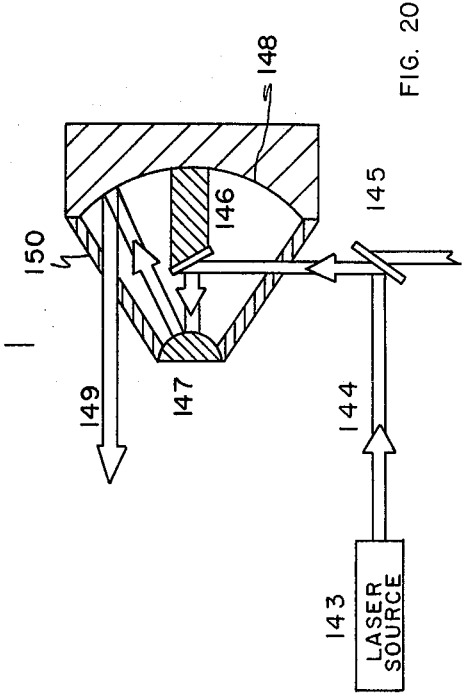
FIG. 20 shows an illustration of the use of combinations of mirrors for implementing an optical system in accordance with this invention.

As an illustration of implementation of the RDVOR or the Reverse RDVOR at optical frequencies, reference is now made to FIG. 20. A laser source 143 emits a coherent, monochromatic light beam 144 which is reflected by plane mirrors 145 and 146 upon a convex mirror 147 postioned at the focus of parabolic reflector 148. The mirrors 146, 147 and 148 are assembled rigidly together with the aid of supports 150 for mirror 147, in the well-known Cassegrain mounting manner. The light beam 144 emerges by final reflection from all exposed parts of the surface 148 as a band of parallel rays of which only 149 is shown for illustration. The combination of mirrors 148, 147, 146 and 145 can also be used alternately or continuously for receiving a light beam reflected or emanated by a distant target object. The entire combination of laser source and mirrors in FIG. 20 can be made to execute a predetermined reciprocating rectilinear motion in accordance with the present invention.

Figure 21:
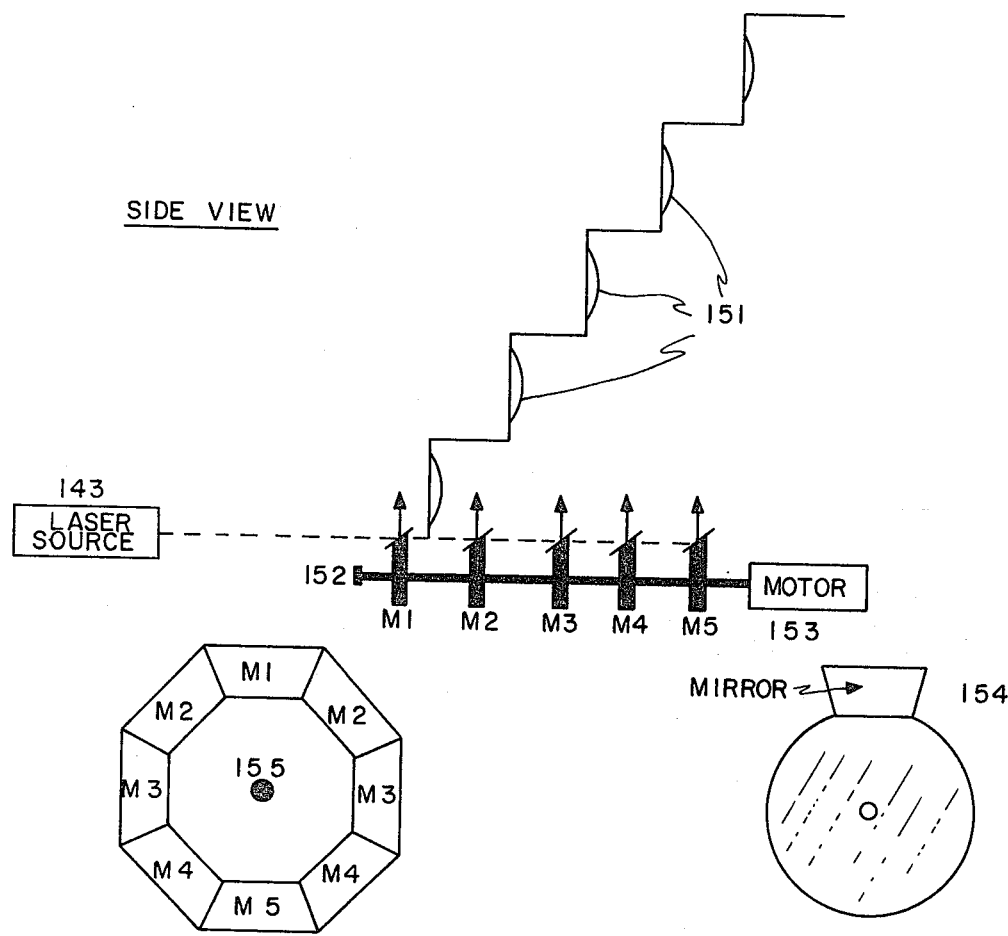
FIG. 21 shows a detailed illustration of a technique for commutating optical reflectors for laser implementations of a system in accordance with this invention.

The rectilinear motion of the optical source and/or receiver can be simulated by means of commutated stationary Cassegrain mirror structures as illustrated in FIG. 21. With reference to FIG. 21, five Cassegrain mirror structures are shown, marked 151, for illustration. The beam from the laser source (or to the optical receiver) 143 is reflected by the commutating mirrors M1, M2, M3, M4 and M5 to the various Cassegrain mirror structures 151. Each of the commutating mirrors is mounted on a wheel as illustrated by 154. In order to ensure the desired simulation of reciprocating rectilinear motion of the optical source or receiver, the mirrors M1, M2, M3, M4 and M5 are so mounted and aligned on their respective wheels that they appear at any instant of time as illustrated by 155. The illustration 155 in FIG. 21 shows that the first and last wheels along the shaft 152 each carries only one mirror, M1 and M5, respectively. However, the intermediate wheels each carries two mirrors arranged as illustrated in 155. The wheels carrying mirrors M1 and M5 and the mirror pairs M2, M3 and M4 are mounted coaxially on shaft 152, which in turn is rotated by motor 153.

Figure 22:
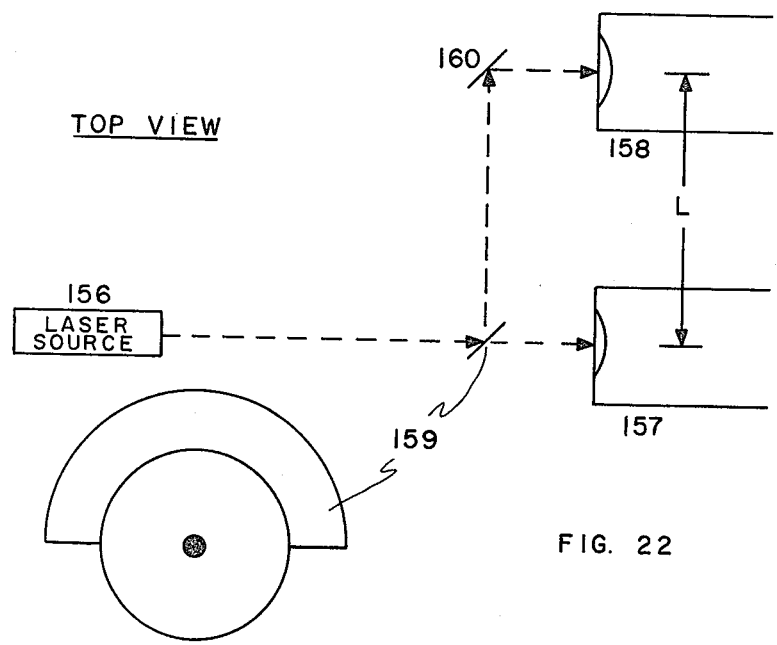
FIG. 22 shows an illustration of a method for employing a single laser source or receiver with two optical radiating or receiving structures in accordance with this invention.

FIG. 22 illustrates the use of one laser source 156 or optical receiver time-shared (over alternating time windows) with two structures 157 and 158 separated by a baseline length L, each of which is of the form illustrated by FIGS. 20 and 21. With reference to FIG. 22, mirror 159 forms a semicircular arc which, when rotated into reflecting position, blanks out the commutating mirrors of 157. Mirror 159 is rotated at a slower rate with respect to the rotations of the commutating mirrors of 157 and 158.

In the light of the preceding description of the principles of operation and practical implementation of Rectilinear DVOR, it can be concluded that of the various types of VOR systems devised to date, the Rectilinear DVOR described in this invention is unquestionably the simplest and most intrinsically error free. The advantages of Rectilinear DVOR can be summarized as follows:

First, Rectilinear DVOR is potentially more accurate than any other system devised to date because it:
(a) Depends on the measurement of frequency rather than phase. It is therefore not as subject as other systems to zero-shift errors, errors due to propagation anomalies (such as multipath, etc.), errors due to analog circuit instabilities (which vary as functions of time and temperture) and differential group delay variations (such as are found in filters, limiters, discriminators, modulators, VCO's, etc.)
(b) Employ signals which are self-referencing. Thus, the effects of differences in receiver transmission paths and circuits for separate data and reference signals are completely eliminated.
(c) Does not rely on precise electro-mechanical alignment such as do all other systems implemented to date.
(d) Is principally digital; the directional information is determined from the peak-to-peak jumps of a square-wave frequency modulation which is measured by digital circuits with the attendant precision and stability (as a function of time and temperature) inherent in digital circuits.

Second, Rectilinear DVO is readily made compatible with both circular DVOR and PDVOR signal spectra and equipment.

Third, Rectilinear DVOR is simple, from the viewpoint of both ground station and VOR receiver implementation.

Fourth, Rectilinear DVOR is cost-effective--from the viewpoint of both the ground station and navigation receiver.

While there has been described what is at present considered a representative embodiment of the invention, it will be obvious to those skilled in the art that various changes and modifications may be made therein without departing from the invention, and it is aimed in the appended claims to cover all such changes and modifications as fall within the true spirit and scope of the invention.

What is claimed is:

1. A method for transmitting carrier waves having directionally dependent frequency modulation for determining elevational and azimuthal angles of propagation of the carrier waves comprising the steps of:
   providing a first position for radiating carrier waves;
   providing a second position for radiating carrier waves;
   repetitively moving the first radiating position along a first line of motion having a predetermined, fixed location in a frame of reference; and
   repetitively moving the second radiating position along a second predetermined line of motion having a predetermined, fixed location in the frame of reference;
   the radiating positions being moved at a velocity which is uniform through at least a portion of their respective lines of motion; and,
   at least a portion of the first line of motion being non-parallel to at least a portion of the second line of motion.

2. The method of claim 1 wherein the first and the second lines of motion are non-parallel.

3. The method of claim 1 wherein the first radiating position is moved by sequentially radiating carrier waves from plural antenna elements arranged along the first line of motion.

4. The method of claim 1 wherein the first radiating position is moved by moving an antenna element along the first line of motion.

5. The method of claim 1 wherein the first radiating position is moved along the first line of motion at a uniform velocity.

6. The method of claim 1 wherein the first radiating position is moved along the first line of motion at plurality of different uniform velocities in a known sequence.

7. The method of claim 1 further comprising the steps of:
   generating first carrier waves to be radiated from the first radiating position;
   generating second carrier waves to be radiated from the second radiating position, the second carrier waves being of a different frequency than the first carrier waves, whereby the radiating position from which the carrier waves are radiated is determinable from the frequency of the carrier waves.

8. The method of claim 1 further comprising the steps of:
   generating carrier waves to be radiated from the first radiating position; and
   modulating the generated carrier waves to identify the carrier waves as having been radiated from the first radiating position.

9. The method of claim 1 wherein the first line of motion is a substantially straight line and wherein the first radiating position is moved with a uniform speed along the first line of motion, reversing direction each time the first radiating position reaches an end of the first line of motion.

10. The method of claim 1 wherein the first radiating position is moved by successive sweeps with a uniform speed in the same direction along the first line of motion.

11. The method of claim 10 further comprising the steps of:
generating the carrier waves; and,
radiating the carrier waves from a stationary antenna, whereby a reference frequency is radiated for determining the Doppler shifts due to motion of the first and second radiating positions.

12. The method of claim 1 wherein the first radiating position is moved along the first line of motion in a plurality of sweeps along the first line of motion and the direction of motion is reversed in a known sequence.

13. The method of claim 1 further comprising the steps of:
providing a third position for radiating carrier waves;
providing a fourth position for radiating carrier waves;
moving the third radiating position along a line of motion parallel to the first line of motion in a direction opposite the direction of motion of the first radiating position; and,
moving the fourth radiating position along a line of motion parallel to the second line of motion in a direction opposite the direction of motion of the second radiating position.

14. The method of claim 1 wherein the first and second lines of motion lie in generally parallel planes.

15. The method of claim 1 wherein the first and second lines of motion are substantially straight lines and wherein the first and second radiating positions are repetitively moved at a substantially uniform speed along the respective lines of motion and the direction of motion is reversed at the ends of the lines of motion; whereby elevational and azimuthal angles of propagation are determinable solely responsively to the amplitude of the frequency shift induced by reversal of the direction of the motion of the first and second radiating positions, rather than the phase of the frequency shifted waveform.

16. The method of claim 1 further comprising the steps of:
providing a third position for radiating carrier waves; and,
repetitively moving the third radiating position along a third line of motion non-parallel and non-coplanar with respect to the first and second lines of motion.

17. A method for receiving carrier waves to impart a frequency modulation to the carrier waves for determining elevational and azimuthal angles of a source of the carrier waves, comprising the steps of:
providing a receiving antenna having a first receiving position for receiving carrier waves from the source and a second receiving position for receiving carrier waves from the source;
repetitively moving the first receiving position along a first line of motion fixed in the frame of reference of the receiving antenna; and
repetitively moving the second receiving position along a second line of motion having a fixed orientation with respect to the first line of motion; at least a portion of the first line of motion being non-parallel to at least a portion of the second line of motion.

18. The method of claim 17 wherein the first and the second lines of motion are non-parallel.

19. The method of claim 17 wherein the first receiving position is moved by sequentially receiving carrier waves from plural antenna elements arranged along the first line of motion.

20. The method of claim 17 wherein the first receiving position is moved by moving an antenna element along the first line of motion.

21. The method of claim 17 wherein the first receiving position is moved along the first line of motion at a uniform velocity.

22. The method of claim 17 wherein the first receiving position is moved along the first line of motion at plurality of different uniform velocities in a known sequence.

23. The method of claim 17 further comprising the steps of:
separately coding carrier waves from the first and second receiving positions so that the receiving position at which the carrier waves are received is determinable from the coding of the carrier waves.

24. The method of claim 17 wherein the first line of motion is a substantially straight line and wherein the first receiving position is moved with a uniform speed along the first line of motion, reversing direction each time the first receiving position reaches either end of the first line of motion.

25. The method of claim 17 wherein the first receiving position is moved by successive sweeps with a uniform speed in the same direction along the first line of motion.

26. The method of claim 17 wherein the first receiving position is moved along the first line of motion in a plurality of sweeps along the first line of motion and the direction of motion is reversed in a known sequence.

27. The method of claim 17 further comprising the steps of:
providing a third position for receiving carrier waves;
providing a fourth position for receiving carrier waves;
moving the first receiving position along a line of motion parallel to the first line of motion in a direction opposite the direction of motion of the first receiving position; and,
moving the fourth receiving position along a line of motion parallel to the second line of motion in a direction opposite the direction of motion of the second receiving position.

28. The method of claim 17 wherein the first and second lines of motion lie in generally parallel planes.

29. The method of claim 17 wherein the first and second lines of motion are substantially straight lines and wherein the first and second receiving positions are repetitively moved at a substantially uniform speed along the respective lines of motion and the direction of motion is reversed at the ends of the lines of motion; whereby elevational and azimuthal agnles of propagation are determinable solely responsively to the amplitude of the frequency shift induced by reversal of the direction of the motion of the first and second radiating positions, rather than the phase of the frequency shift waveform.

30. The method of claim 17 further comprising the steps of:

providing a third position for receiving carrier waves; and, repetitively moving the third receiving position along a third line of motion non-parallel and non-coplanar with respect to the first and second lines of motion.

31. A method of radiating carrier waves from a known location on a reference coordinate system, said carrier waves having a frequency modulation dependent on an angle of propagation of the carrier waves from the location, comprising the steps of:

providing a position from which carrier waves are radiated; and, moving the radiating position along a line of motion having a predetermined, fixed orientation on the reference coordinate system, so that at least one of the speed and direction of motion of the radiating position changes abruptly in a repetitive manner; whereby an angle of propagation of the carrier waves is determinable solely responsively to the amplitude of the frequency shift in the radiated carrier wave induced by the abrupt change in the motion of the radiating position, rather than being determinable from the phase of the frequency shifted waveform.

32. The apparatus of claim 31 wherein the determinable angle of propagation is an azimuthal angle in an indeterminant quadrant.

33. A method of receiving carrier waves and frequency modulating the carrier waves dependent on the angle of reception of the carrier waves from at least one transmitter, comprising the steps of:

providing a position for receiving carrier waves from at least one transmitter of carrier waves having a known location; and, moving the receiving position along a line of motion, so that at least one of the speed and direction of the position changes, whereby the angle of reception of the carrier waves is determinable with respect to the orientation of the line of motion solely responsively to the amplitude of the frequency shift in the received carrier waves induced by the change in the motion of the radiating position, rather than being determinable from the phase of the frequency shifted waveform.

34. An apparatus for radiating carrier waves having directionally dependent frequency modulation for determining elevational and azimuthal angles comprising:

first antenna means for radiating carrier waves from a first radiating position;

second antenna means for radiating carrier waves from a second radiating position;

first means for moving the first radiating position along a first line of motion, said first line of motion having a known, fixed location in a frame of reference so that at least one of the speed and direction of motion of the first radiating position changes abruptly thereby inducing an abrupt, directionally dependent Doppler shift in the frequency of the carrier waves; and, second means for moving the second radiating position along a second line of motion having a known, fixed location in the frame of reference so that at least one of the speed and direction of motion of the second radiating position changes abruptly, thereby inducing an abrupt, directionally dependent Doppler shift in the frequency of the carrier waves.

35. The apparatus of claim 34 wherein the first and the second lines of motion are non-parallel and lie on generally parallel planes.

36. The apparatus of claim 34 wherein the first and second radiating positions radiate carrier waves omnidirectionally.

37. An apparatus for receiving carrier waves, said carrier waves having a frequency modulation dependent on the azimuthal and elevational angles of propagation of the carrier waves from at least one transmitter having a known location on a reference coordinate system comprising:

first antenna means for receiving carrier waves at a first receiving position;

second antenna means for receiving carrier waves at a second receiving position;

first means for moving the first receiving position along a first line of motion; and, second means for moving the second receiving position along a second line of motion having a fixed orientation with respect to the first line of motion.

38. The apparatus of claim 37 wherein the first line of motion and the second line of motion are non-parallel.

39. The apparatus of claim 37 wherein the first line of motion and the second line of motion lie in parallel planes.

40. The apparatus of claim 37 wherein the first and second lines of motion are coplanar.

41. A method of radiating carrier waves from a location, said carrier waves having a frequency modulation dependent on an angle of propagation of the carrier waves from the location, comprising the steps of:

providing a position from which carrier waves are radiated; and, moving the radiating position along a substantially straight line of motion, the radiating position being repetitively moved at a substantially uniform speed along the line of motion, and the direction of motion being reversed at the ends of the line of motion; whereby an angle of propagation of the carrier waves is determinable solely responsively to the amplitude of the frequency shift in the radiated carrier wave induced by the change in the direction of the motion of the radiating position.

42. A method of receiving carrier waves and frequency modulating the carrier waves dependent on the angle of reception of the carrier waves comprising the steps of:

providing a position for receiving carrier waves from at least one transmitter of carrier waves; and, moving the receiving position along a substantially straight line of motion, the receiving position being repetitively moved at a substantially uniform speed along the line of motion, and the direction of motion being reversed at the ends of the line of motion; whereby the angle of reception of the carrier waves is determinable with respect to the orientation of the line of motion solely responsively to the amplitude of the frequency shift in the received carrier wave induced by the change in the direction of the motion of the radiating position.

* * * * *